United States Patent [19]

Smith

[11] Patent Number: 5,492,423
[45] Date of Patent: Feb. 20, 1996

[54] METHOD AND APPARATUS FOR DISPENSING MONEY ORDERS INCLUDING MEANS TO DETECT MONEY ORDERS

[75] Inventor: Lawrence G. Smith, Orlando, Fla.

[73] Assignee: Traveler's Express Company, Inc., Minneapolis, Minn.

[21] Appl. No.: 404,134

[22] Filed: Mar. 13, 1995

Related U.S. Application Data

[63] Continuation of Ser. No. 151,060, Nov. 12, 1993, abandoned, which is a continuation of Ser. No. 933,869, Aug. 21, 1992, abandoned, which is a continuation of Ser. No. 814,039, Dec. 24, 1991, abandoned, which is a continuation of Ser. No. 494,665, Mar. 16, 1990, abandoned, which is a continuation of Ser. No. 406,979, Sep. 13, 1989, abandoned, which is a continuation of Ser. No. 121,074, Nov. 16, 1987, Pat. No. 4,870,596, which is a continuation of Ser. No. 60,762, Jun. 8, 1987, Pat. No. 4,812,986, which is a division of Ser. No. 877,539, Oct. 31, 1986, Pat. No. 4,699,532, which is a division of Ser. No. 596,291, Apr. 3, 1986, Pat. No. 4,625,275.

[51] Int. Cl.$^6$ ................................................. B41J 21/16
[52] U.S. Cl. ..................... 400/279; 400/74; 400/693; 400/708; 395/111
[58] Field of Search ................. 400/693, 74, 708, 400/279; 235/379; 283/58, 74; 364/408, 479; 101/19, 66, 93.05, 93.08, 93.24; 395/111

[56] References Cited

U.S. PATENT DOCUMENTS

| | | |
|---|---|---|
| 2,071,141 | 2/1937 | Placke . |
| 3,722,405 | 3/1973 | Mahoney et al. .......................... 101/45 |
| 3,757,685 | 9/1973 | Woodie et al. ............................ 101/66 |

(List continued on next page.)

FOREIGN PATENT DOCUMENTS 0189124  7/1986  European Pat. Off. ............... 400/693

OTHER PUBLICATIONS

"Automatic Money Order Dispenser, Model 1001", Entronics Corporation.
"Automated Money Order Dispenser", American Express Information Services Corporation, 1990.
"The Automatic Money Order Dispenser", Indiana Financial Systems, Inc.—Brandt/Sharp Authorized Sales/Services, 1989.
"Series T4325 Money Order Dispenser", Standard Register, 1991.
"The Automatic Money Order Dispenser, Model 1001", The Standard Register, 1991.
"AMOD 2000 Automated Money Order Dispenser—User's Guide", American Express Information Services Corporation, Dec. 1990.

(List continued on next page.)

*Primary Examiner*—Edgar S. Burr
*Assistant Examiner*—John S. Hilten
*Attorney, Agent, or Firm*—Michael A. O'Neil

[57] ABSTRACT

A method and apparatus for dispensing money orders at a plurality of retail establishments is provided, including one or more data collector devices connected to a host device. Preferably, each of the money order dispensers include a digital processor for controlling the overall operation thereof, a keyboard for entering transaction data to request the printing of a money order, a display for displaying the transaction data, and a dot matrix printer for printing the requested money order. Each dispenser further includes an electrically-eraseable programmable read only memory (E$^2$PROM) for storing a security inhibit printing code, this code being automatically changed to prevent actuation of the printer when the security of the dispenser is compromised. The physical dimensions of the money order dispenser are reduced by providing a dot matrix printer for receiving money orders in a transverse fashion, and software routines are provided to control the dot matrix printer to "rotate" the printed characters whereby money orders are dispensed in a readable fashion.

5 Claims, 3 Drawing Sheets

U.S. PATENT DOCUMENTS

| | | | |
|---|---|---|---|
| 3,814,227 | 6/1974 | Hurd, III et al. | |
| 3,848,798 | 11/1974 | Riley | 235/101 |
| 3,931,761 | 1/1976 | Carrus et al. | 101/66 |
| 3,970,992 | 7/1976 | Boothroyd et al. | 340/172.5 |
| 3,997,763 | 12/1976 | Schasser | 340/149 R |
| 4,025,905 | 5/1977 | Gorgens | 340/172.5 |
| 4,035,792 | 7/1977 | Price et al. | 340/277 |
| 4,053,735 | 11/1977 | Foudos | 101/19 |
| 4,082,945 | 4/1978 | van de Goor et al. | 101/93 |
| 4,175,694 | 11/1979 | Donabin | 235/475 |
| 4,225,779 | 9/1980 | Sano et al. | 235/379 |
| 4,266,121 | 5/1981 | Hirose | 235/381 |
| 4,270,042 | 5/1981 | Case | 235/379 |
| 4,317,028 | 2/1982 | Simjian | 235/380 |
| 4,321,671 | 3/1982 | Ohsako | 364/405 |
| 4,341,951 | 7/1982 | Benton | 235/379 |
| 4,355,369 | 10/1982 | Garvin | 364/900 |
| 4,385,285 | 5/1983 | Horst et al. | 382/3 |
| 4,417,137 | 11/1983 | Lundblad | 235/379 |
| 4,463,939 | 8/1984 | Watanabe | 400/586 |
| 4,480,933 | 11/1984 | Shibayama et al. | 400/615.2 |
| 4,501,224 | 2/1985 | Shibayama et al. | 101/66 |
| 4,545,695 | 10/1985 | Agata | 400/615.2 |
| 4,593,407 | 6/1986 | Konishi et al. | 382/46 |
| 4,611,286 | 9/1986 | Nishimura et al. | 364/405 |
| 4,625,275 | 11/1986 | Smith | 364/401 |
| 4,699,532 | 10/1987 | Smith | 400/104 |
| 4,733,887 | 3/1988 | Mowry, Jr. | |
| 4,749,213 | 6/1988 | Mowry, Jr. | |
| 4,812,986 | 3/1989 | Smith | 400/104 |
| 4,870,596 | 9/1989 | Smith | 902/1 |
| 4,894,784 | 1/1990 | Smith | 364/479 |
| 5,062,666 | 11/1991 | Mowry, Jr. | |

OTHER PUBLICATIONS

"AMOD 2000 Automated Money Order Dispenser—Manager's Guide", American Express Information Services Corporation, Dec. 1990.

"Series T4300 Money Order Dispenser", The Standard Register Company, 1986.

"Series T4500 Official Items Disburser", The Standard Register Company, 1986.

"NTN Supermarket Payment Systems", National Transaction Network, Inc., 1990.

"The NTN Convenient Cash Machine", National Transaction Network, Inc., 1990.

"NTN Stand–Beside Supermarket Payment Solutions", National Transaction Network, Inc., 1990.

"NTN Integrated EFT Solutions for the IBM 4680 Store System", National Transaction Network, Inc., 1990.

"Micro–Max, an Integrated Financial Management System for Retail Petroleum Stations", Schlumberger Technologies, 1990.

"T4300 Money Order Dispenser—Executive Manual", The Standard Register Company, 1988.

"Travelers Express Advertisement", Winter 1992.

METHOD AND APPARATUS FOR DISPENSING MONEY ORDERS INCLUDING MEANS TO DETECT MONEY ORDERS

This application is a continuation of U.S. application Ser. No. 08/151,060 filed Nov. 12, 1993 and now abandoned, which is a continuation of U.S. application Ser. No. 07/933,869, filed Aug. 21, 1992 and now abandoned, which is a continuation of U.S. application Ser. No. 07/814,039, filed Dec. 24, 1991 and now abandoned, which is a continuation of U.S. application Ser. No. 07/494,665, filed Mar. 16, 1990 and now abandoned, which is a continuation of U.S. application Ser. No. 07/406,979, filed Sep. 13, 1989 and now abandoned, which is a continuation of U.S. application Ser. No. 07/121,074, filed Nov. 16, 1987 and issued as U.S. Pat. No. 4,870,596, which is a continuation of U.S. application Ser. No. 07/060,762, filed Jun. 8, 1987 and issued as U.S. Pat. No. 4,812,986, which is a division of U.S. application Ser. No. 06/877,539, filed Oct. 31, 1986 and issued as U.S. Pat. No. 4,699,532, which is a division of U.S. application Ser. No. 06/596,291, filed Apr. 3, 1986 and issued as U.S. Pat. No. 4,625,275.

TECHNICAL FIELD

The present invention relates generally to dispensing machines, and more particularly to a method and apparatus for dispensing money orders at a plurality of retail establishments.

BACKGROUND OF THE INVENTION

Money order dispensing machines are well-known in the prior art. Such machines typically include a number of moveable printing levers and a printing control arm. In response to a customer request, the machine operator positions the printing levers at a position corresponding to the requested amount of the money order, inserts a blank order in the machine, and actuates the printing control arm. The above steps must be repeated each time a money order is requested by a customer.

Such mechanical money order dispensing machines have proven inadequate since they do not include any effective means for securing the dispenser. In particular, the machine operator can produce a "counterfeit" order by simply separating a blank money order into its separate parts, a customer portion and a vendor portion, and printing different numerical amounts thereon. Such counterfeiting techniques are facilitated by the simple mechanical nature of the prior art money order dispenser, wherein blank money orders are inserted one at a time for manual printing. Of course, this manual operation also makes the dispenser combersome to use, as well as extremely slow.

Accordingly, there is a need to provide a money order dispenser having increased security, and which can also vend money orders efficiently.

SUMMARY OF THE INVENTION

The present invention provides a method and apparatus for dispensing money orders at a plurality of retail establishments. In a preferred embodiment, one or more sets of money order dispensers are connected to one or more data collector devices, respectively, with the data collector devices in turn connected to a host device for controlling the overall operation of the system. Generally, each of the money order dispensers includes a digital processor to control the operation thereof, a keyboard for entering transaction data to request the printing of a money order, and a display for displaying system messages and the entered transaction data. Memory devices associated with the digital processor are also provided for storing transaction data, operating programs and control data, and a dot matrix printer is used for printing alphanumeric indicia on the dispensed money orders.

In accordance with more specific features of the present invention, each dispenser preferably includes an electrically-eraseable programmable read only memory ($E^2PROM$). This $E^2PROM$ stores a security inhibit printing code which must be "recognized" by a printer software routine to enable the dot matrix printer. Each dispenser further stores a control software routine which operates to change or erase the security inhibit printing code stored in the $E^2PROM$ when the security of the dispenser is compromised. For example, when a storage compartment cover of the dispenser is opened outside of a proper money order loading sequence, the control software routine changes the security inhibit printing code, thereby inhibiting the dot matrix printer. However, the remainder of the dispenser peripherals operate normally to allow the system operator to reestablish printer operation after the "compromised" condition has been rectified.

Preferably the dot matrix printer receives a money order in a transverse fashion with respect to the normal direction of printing thereon. This facilitates the use of a small printer, thereby reducing the overall dimensions of the dispenser. The printer software routine associated with the dispenser is further used to control the dot matrix printer in such a manner to change the normal orientation of the alphanumeric indicia printed on the money order such that the order is produced with the requested amount in a readable form. The dot matrix printer also includes a photocell sensing device for determining whether a money order and a printing ribbon are properly located in the dot matrix printer prior to the printing of the order. The money orders are delivered to the dot matrix printer in a continuous fan-folded stack. These features of the present invention insure that "counterfeit" money orders cannot be printed by the vendor.

In accordance with other features of the present invention, each data collector has a "manager" function which allows the system operator (e.g., a financial institution) to define control data for managing the operation of the dispensers connected thereto. In particular, the operator may predetermine authorized operational limits, such as a maximum limit on the amount of the money order, maximum amounts for higher limit items available with proper authorization codes, and various fee rates to be charged to the customers. This control data and changes thereto are down-loaded into the $E^2PROM$ associated with each processor.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
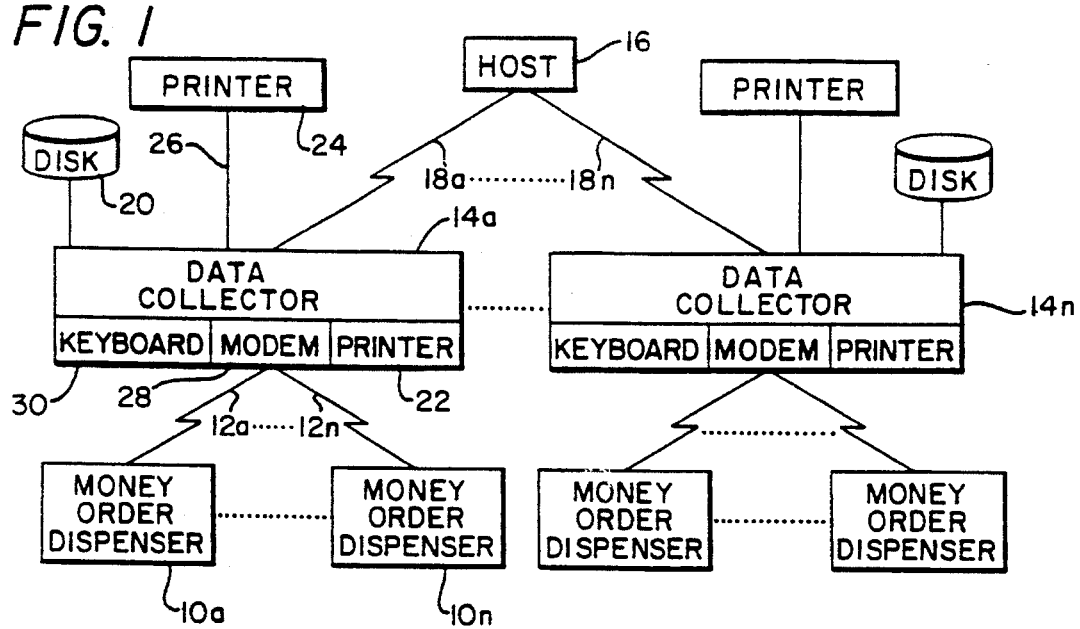
FIG. 1 is a block diagram of a desired system configuration incorporating a plurality of money order dispensers connected to one or more data collector devices, which are in turn connected to a host device.

With reference now to the FIGURES wherein like reference characters designate like or similar elements, FIG. 1 is a block diagram of a representative system according to the present invention for dispensing money orders at a plurality of retail establishments. In FIG. 1, a money order dispenser 10a is shown connected directly through a communications link 12a to a data collector 14a. The dispenser 10a is located at a retail establishment where customers request the issuance of a money order from the retail establishment vendor. The data collector 14a provides various management functions for money order dispensers 10a–10n on a time-shared basis. In the preferred embodiment, a plurality of data collectors 14a–14n are connected to a host device 16 through communications links 18a–18n. Each communications link 18 is either a modem link or an RS232 serial full-duplex interface for direct connection to the host device 16. Alternately, the data collectors 14 may be connected to an external modem (not shown) and then to the host device 16.

As shown in FIG. 1, the data collector 14a includes a floppy diskette 20 for storing a cumulative record of the money order transactions at its respective money order dispensers 10a–10n. Data collector 14a also includes an internal printer 22 for printing this transaction information, although alternately, an external printer 24 is used for this purpose through an RS232 serial link 26. An internal modem 28 is also provided for direct communications to the money order dispensers 10a–10n over the communications links 12a–12n at variable baud rate settings. As will be described in more detail below, each data collector 14 has the ability to read and program various memory devices in each money order dispenser connected thereto.

Referring again to FIG. 1, the data collector 14a further includes a full alphanumeric keyboard 30 which, as will be described below, allows the system operator (e.g., a financial institution) to define control data for managing the operation of the money order dispensers connected thereto. In particular, through the keyboard 30, or alternately a "manager" function switch associated with the data collector 14a, the operator sets limits on the following variables listed in TABLE I:

TABLE I

| VARIABLE NAME | DEFINITION |
|---|---|
| [-MCH MO# XXXXX-] | Total number of money orders to be printed before dispenser must be reauthorized |
| [-MCH MO# XXXXXXX-] | Maximum money order dollar amount to be issued before dispenser must be reauthorized |
| [-CST MO$ XXXXX.XX-] | Maximum dollar value per money order per customer |
| [-MCH CK# XXXXX-] | Maximum number of vendor payments which may he printed before dispenser must be reauthorized |
| [-MCH CK# XXXXX.XX-] | Maximum vendor payment dollar amount which can be issued before |

TABLE I-continued

| VARIABLE NAME | DEFINITION |
|---|---|
| | dispenser must be reauthorized |
| [-CST MO# XXXX-] | Maximum number of money orders which can be printed per customer |
| [-VND CK# XXXX-] | Maximum number of vendor payments which can be printed per vendor |
| [-VND CK# XXXXX.XX-] | Maximum dollar amount per vendor payment |
| [-WARN-#BLANKS XX-] | Number of blank money orders left in dispenser when warning issued |
| [-WARN-#TRANS XX-] | Amount of transaction storage left in dispenser memory when warning is issued |
| [-LOCK # ERRORS XX] | Number of errors allowed before dispenser locks. |

As used throughout the remainder of the specification, the above limits and codes are referred to as "control" data. This control data is transmitted to the various money order devices 10a–10n located at the plurality of retail establishments.

Preferably, each of the other data collectors 14 shown in FIG. 1 include the same type of peripheral devices associated with the data collector 14a. The data collectors 14a–14n also have the capability of automatically polling their associated money order dispensers on command, as well as the ability to recognize invalid data transmissions. Moreover, each data collector includes various software routines for controlling such automatic polling, and for providing test procedures to aid in trouble-shooting and repairing the dispensers.

It should also be appreciated that although the configuration of FIG. 1 is desirable, it is not meant to limit the scope of the present invention. In particular, each money order dispenser of the invention is capable of fully independent stand-alone operation, as well as a direct on-line connection to a point-of-sale system.

Figure 2:
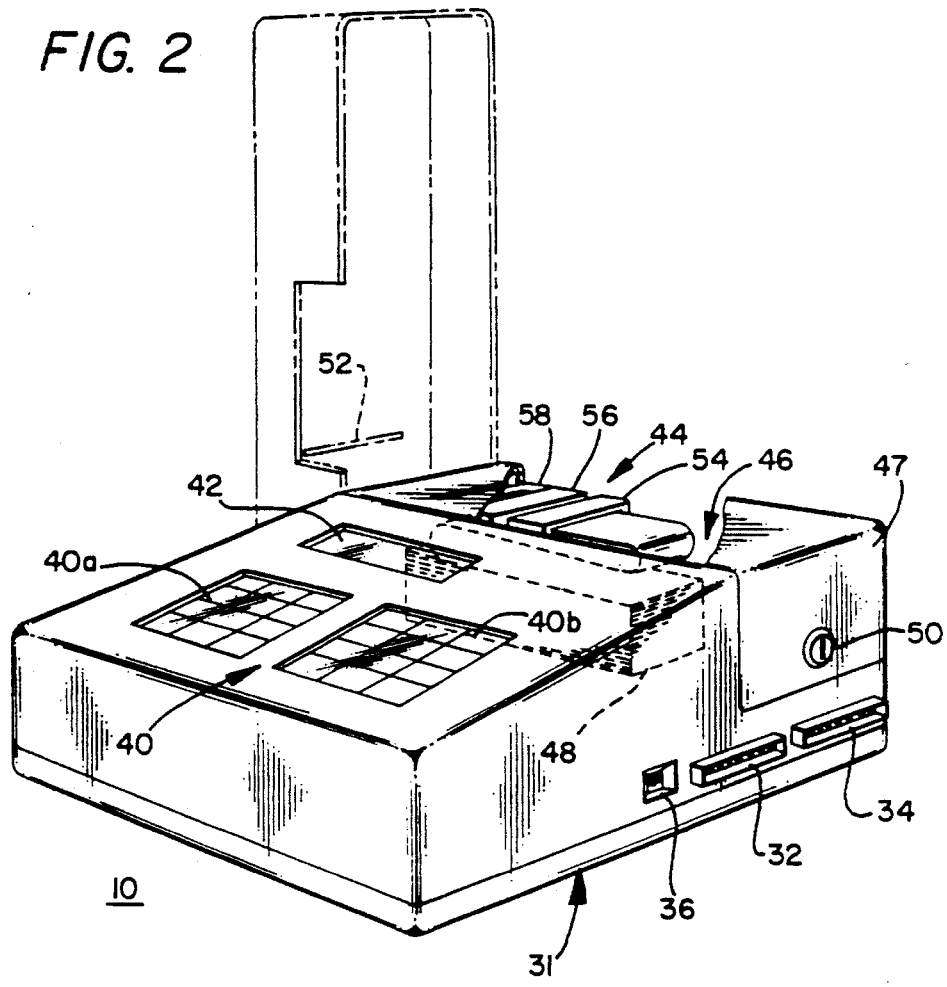
FIG. 2 is a perspective view of one of the money order dispensers of FIG. 1 having its open storage compartment cover shown in phantom.

Referring now to FIG. 2, a perspective view is shown of one of the money order dispensers 10 of FIG. 1. Preferably, the money order dispenser 10 includes a removable bottom panel 31 which is fastened to a countertop at the retail establishment by appropriate securing means. The dispenser 10 is designed to be operable from 115 volts a.c. power, or d.c. power from an appropriate point-of-sale system. The power options are selectable by an internal selection switch (not shown). The dispenser 10 includes two RS232 connector input jacks 32 and 34 for connection to an external journal printer and external modem, respectively. The journal printer (not shown) is a conventional dot matrix printer and is provided for printing a journal tape of all transactions of the money order dispenser. The dispenser 10 also includes a modular phone jack 36, which is connected to an internal modem for data transmission to one of the data collectors 14 as shown in FIG. 1. When the internal modem is not used, the modem interface is brought to the RS232 connector jack 34 for connection to an external modem. Preferably, the external connection is used whenever an acoustical modem is required.

Referring back to FIG. 2, the money order dispenser 10 includes several input/output devices: a keyboard 40 having first and second sections 40a and 40b, a liquid crystal display (LCD) 42 and a dot matrix printer assembly represented generally by the reference numeral 44. As will be described in more detail below, each section of the keyboard 40 includes twelve (12) control keys for entering transaction data to request the printing of a money order, as well as for controlling other functions of the dispenser. The LCD display 42 is preferably a twelve (12) digit display for displaying the transaction data entered via the keyboard 40, and for displaying system messages received from the data collector and host devices associated with the money order dispenser. The dot matrix printer assembly 44 is provided to print the money orders held in a storage compartment 46. As shown in phantom in FIG. 2, the money orders are provided in a continuous fan-folded stack 48 in the storage compartment 46 to insure that counterfeit money orders cannot be printed by the vendor. A keylock 50 is provided to secure a storage compartment cover 47 in a locked position in the dispenser housing. This lock may be electronic if desired. The stack 48 of money orders is loaded into the dispenser by opening the storage compartment cover 47 to an open position as represented in phantom.

As also seen in FIG. 2, the storage compartment cover 47 includes an output throat 52 through which the printed money orders are dispensed. To effect printing of a money order, the dot matrix printer assembly 44 is provided with a sprocket and/or pressure feed clamp 54 for moving the money orders through the dispenser 10, a dot matrix printer 56 and a printing ribbon 58. In response to a customer request for a money order, the vendor enters the requested amount via the keyboard 40 as will be described below. If the money order is within the authorized limits of the dispenser, the dot matrix printer 56 is actuated to print the requested amount alphanumerically on the face of the money order. Upon completion of the printing, the pressure feed clamp 54 automatically advances the printed money order through the output throat 52 for manual removal by the operator. The transaction data, including money order amount, date and time, is then stored on a journal tape by the external journal printer, and also in internal memory.

As will be described below, the dot matrix printer 56 preferably includes a printer carriage for receiving the money order in a transverse fashion with respect to the normal printing of alphanumeric information thereon. This transverse feeding of the money orders allows the use of a relatively small dot matrix printer, thereby reducing the overall physical dimensions of the dispenser. The present invention further provides a control means for controlling the dot matrix printer to "rotate" the alphanumeric indicia printed on the money order such that the money order is produced in a readable form. The control means is required since normal printing of the indicia would render the money order unreadable due to the transverse feed. Accordingly, a printer software routine to be described is provided for controlling the printer to produce readable alphanumeric indicia on the printed money orders.

Figures 3, 4:
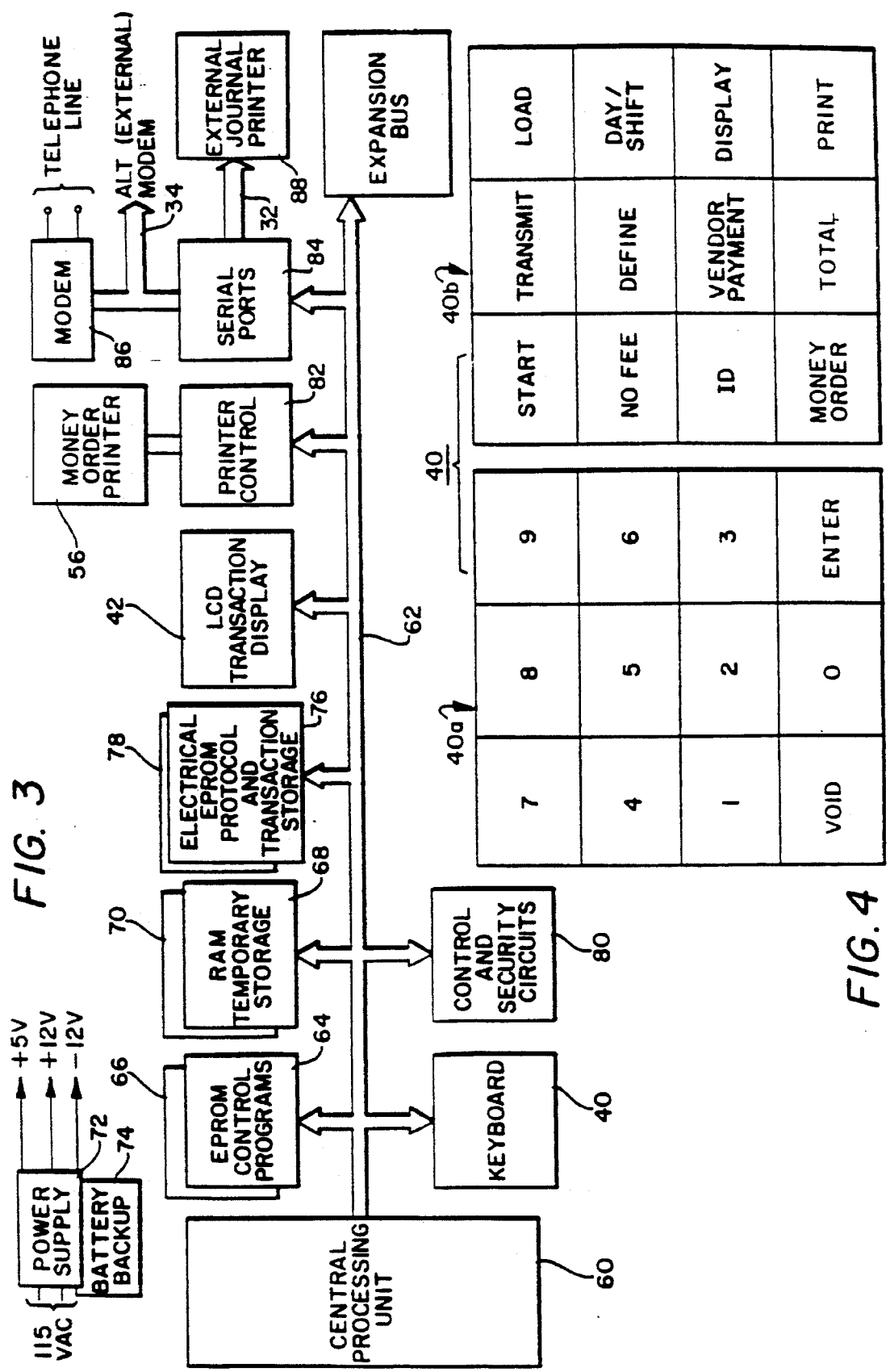
FIG. 3 is a block diagram of the electronic hardware incorporated in the money order dispenser of FIG. 2.
FIG. 4 is a representation of the preferred embodiment of the keyboard used in the money order dispenser of FIG. 2.

Referring now to FIG. 3, a block diagram is shown of the electronic hardware incorporated in the money order dispenser of FIG. 2. In particular, this hardware includes a central processing unit (CPU) 60 for controlling the overall operation of the money order dispenser 10a. The CPU 60 includes data, address and control buses, represented generally by the bus 62. As seen in FIG. 3, the keyboard 40, LCD display 42 and money order printer 56 are connected to the CPU 60 and are controlled thereby by various operating and applications programs resident in eraseable programmable read only memories (EPROM's) 64 and 66. EPROM'S 64 and 66 are connected to the CPU 60 by the bus 62. As also seen in FIG. 3, the money order dispenser 10 includes random access memories (RAM's) 68 and 70 connected to the CPU 60 by the bus 62 for providing temporary storage of data processed by the CPU. The money order dispenser further includes a power supply circuit 72 driven off a standard 115 volts a.c. wall outlet, and an internal rechargeable battery backup 74. The battery backup 74 is provided to supply power for a sufficient time to allow complete memory protection should power be suddenly interrupted to the dispenser 10.

The money order dispenser 10 further includes a pair of electrically-eraseable programmable read only memories ($E^2PROM$'s), or equivalent semi-permanent memory device such as a battery support ram, 76 and 78 connected to the CPU 60 by the bus 62. The $E^2PROM$ 76 is provided for storing various communication protocols utilized by the money order dispenser. In particular, the $E^2PROM$ 76 supports the NCR foreign attachment protocol, MSI special protocol, SDLC protocol and IBM 3680 store system interface. Additional protocols may be down-loaded into the $E^2PROM$ 76 by the data collector as required. Data and control codes for the above protocols are well known in the prior art and a description thereof is unnecessary for a complete understanding of the present invention.

According to a feature of the present invention, the $E^2PROM$ 78 is provided to store the transaction data for between 500–2000 vendor/customer transactions. Moreover, the $E^2PROM$ 78 also stores a security inhibit printing code for the money order dispenser 10 for security purposes. The printer software routine for controlling the dot matrix printer 56 must "recognize" the security inhibit printing code resident in $E^2PROM$ 78 in order to operate the dot matrix printer 56. If the security of the money order dispenser is compromised in any way, a control software routine stored in EPROM 64 operates to change or erase the security inhibit printing code stored in the $E^2PROM$ 78. Once this code has been changed or erased, the software for controlling the printer 56 cannot be processed by the CPU 60, thereby preventing further printing of money orders from the dispenser. However, although the printer operation is inhibited, the remainder of the dispenser peripherals operate normally to allow the link to be restored by the financial institution. Preferably, the security inhibit printing code is down-loaded from the respective data collector device or the host device, and may be changed at regular intervals for increased security.

A "compromised" condition exists, for example, when the storage compartment cover 47 is opened outside of a normal money order loading sequence to be described, or when the bottom panel 31 is removed without a service request. The security code will also be changed or erased to inhibit the printer when power to the dispenser is interrupted, if a previously determined amount or number of money orders, or other system operator-imposed constraints, have been exceeded, or if no recent communications have taken place within authorized time limits.

A control and security circuit 80 is also provided and includes an internal clock for controlling the timing of the various circuits shown in FIG. 3, and also for defining the date and time information for the transaction data. As discussed above, the LCD display 42 is provided for displaying this transaction data as well as system messages. The display software stored in EPROM 66 also disables the display if the dispenser is not in use for a period of time, and controls the display to indicate when the $E^2PROM$ 78 is approximately filled with transaction data. The money order dispenser 10 will discontinue further issuance of money orders and notify the operator if the $E^2PROM$ 46 is full. According to the present invention, the transaction data is then transmitted to the respective data collector device of FIG. 1 before the money order dispenser 10 may again issue money orders. The use of the non-volatile reusable E²PROM 78 or equivalent device in conjunction with the battery backup 74 insures that the transaction data is not lost upon power failure or surges.

Referring simultaneously to FIGS. 2 and 3, the dot matrix printer 56 is controlled by a printer control circuit 82 connected to the CPU 60 by the bus 62 and the printer software routine. The money order dispenser 10 further includes serial ports 84, connected to the CPU 60 by the bus 62, for driving an internal modem 86, and the external journal printer 88 via an RS232 duplex link. As noted above, when the internal modem 86 is not used, the modem interface is brought to the RS232 connector jack 34 for an external modem. Preferably, the external modem connection is used whenever an acoustical modem is required.

Referring now to FIG. 4, a desired format of the keyboard 40 of the money order dispenser is shown. This keyboard includes a first section 40a including the numerical keys "0"–"9" for entering control and transaction data, and a "VOID" and "ENTER" control key. The second section 40b of the keyboard 40 includes various control keys, the function of which will be described in more detail below.

Operation of the money order dispenser 10 of the present invention occurs through a plurality of operation modes. The first of these modes is a "Definition Mode", during which various codes are entered, inspected or changed by the operator. The LCD display 42 defines which entry to enter, inspect or change. In operation of this mode, if the entry is to be changed, a new value is entered via the first section 40a of the keyboard 40 followed by depression of the "ENTER" key. If the displayed entry is to remain unchanged, the "ENTER" key is the only key depressed. The control keys of the second section 40b generally define what messages are presented to the operator.

Since the money order dispenser is preferably left "on" at all times, the Definition Mode is entered when the operator pushes the "START" and "DEFINE" keys of the second section 40b. The following message is then displayed on the display 42:

[-SECURITY#-]

The security number is a five digit number and is not displayed. This number must be correctly entered by the vendor in order for the sequence to continue. After the security number has been entered and verified, a manual entry of a store identification number is required. Accordingly, the following store number message is displayed on the LCD display 42:

[-STXXXXXXXXXXXXXX-]

The store number may be 1–14 characters long and once entered by the vendor is transmitted to the respective data collector as discussed above with respect to FIG. 1.

The Definition Mode sequence continues with depression of the "DAY/SHIFT" key which produces the following sequential displays for entering or verification of date and time information, this information being recorded as part of the transaction data:

[-DATE XX/XX/XX-]

[-TIME XX:XX:XX-]

The Definition Mode sequence further continues with the following displays for entering of identification entries, money order fees, a phone number dialed automatically under certain conditions, and an "ID USE" code for money order and vendor payment transactions:

[-ID XXX-]
[-FEE XXX.XX, YY.YY-]
[-PHX-XXX-XXX-XXXX-]
[-ID USE      X-]

Specifically, the system includes twenty money order fees where XXX.XX is the dollar breakpoint, and YY.YY is the fee charged for any money order greater than the previous money order and less than or equal to the present XXX.XX breakpoint. The "ID USE" code takes on the following possible values:

0—No ID Number needs to be entered;

1—All ID Numbers are entered at the start of the day only;

2—A valid ID Number must be entered for each transaction.

Entering of the above code information at the money order dispenser, as well as the information in TABLE I at the data collector, constitutes the Definition Mode. Once the last enter key has been pressed at the dispenser, the display screen 24 will blank and the Definition Mode will be exited.

Under a "Start Mode", the operator of the money order dispenser at a retail establishment enters certain information at the start of each day. In particular, a start-up "ID" or "access" code is required to operate the dispenser. In the Start Mode, actuation of the "START" key of the second section 40b causes the following message to be displayed:

[-ID       -]

The operator must then enter a valid ID number to start the system. If the "ID USE" code discussed above is "1", the rest of the valid ID numbers must then be entered. Subsequently, the following message is displayed:

[-BEG #XXXXXXXXX-]

The above display prompts the operator to enter an internal serial number of the first money order in the stack. The serial number is automatically incremented for each money order dispensed. Once the last enter key has been depressed, the display screen will blank and the Start Mode will be exited.

The third mode of operation is the "Issue Money Order" Mode. This Mode is entered when a customer requests the issuance of a money order. To accomplish this task, the operator pushes the "START" key of the second section 40b. If the "ID USE" Code is "2", an "ID" number is required, and this number is then entered via the first section 40a of the keyboard, followed by depression of the "ID" key of the second section 40b. If no fee is to be charged, the "NO FEE" key of the second section 92 is also depressed. Subsequently, a dollar amount for the money order is entered via the numeric keys of the first section 40a followed by depression of the "MONEY ORDER" key of section 40b. The "TOTAL" key of section 40b is then depressed if more than one money order is required to be printed. The fee for each money order is automatically added to the total. Finally, the "PRINT" key of section 40b is then depressed and the requested money order is printed by the dot matrix printer 56 as discussed above with respect to FIG. 2. Note that if the "VOID" key of section 40a is depressed before the "TOTAL" key, however, the last money order entry will be voided. Moreover, if the "VOID" key is depressed before the "PRINT" key is depressed, all the money orders for the current customer are voided.

Under another operational mode, an "Issue Vendor Payments" Mode, the vendor of the retail establishment may receive payments according to the limits established by the operator of the data collector device. This mode requires depression of the "START" key and entering of an "ID" if the "ID USE" code is set as "2". Subsequently, the "VENDOR PAYMENT" key of section 40b is depressed followed by the "TOTAL" and "PRINT" keys as discussed above with respect to the issuance of a money order.

Under a "Load Mode", money order forms are loaded into the money order dispenser 10. This is accomplished by opening the money order storage compartment cover 47, depressing the "START" key and then a "LOAD" key of section 40b. Depression of these keys will produce the following sequential display messages:

```
[-SECURITY #          -]
    [-BEG # XXXXXXXX-]
    [-END # XXXXXXXX-]
```

The security number is the same number discussed above in the Definition Mode. The last two codes above are the beginning and ending serial numbers of the blank money order stock which must be entered when loading a new series of money orders. Once the last enter key has been depressed and the storage compartment cover 47 has been closed, the display 42 will blank and the Load Mode will be exited.

The money order dispenser also includes a "Transmission Mode" which is entered upon depression of the "START" and "TRANSMIT" keys of section 40b. Upon depression of these keys, the following sequential display messages occur:

```
[-SECURITY #         -]
    [-DIAL TELEPHONE #-]
```

After entering of the security number and dialing the telephone number for connection to the appropriate data collector, the operator places the phone receiver in the modem. The "START" key is then depressed to cause the dispenser to transmit the stored transaction data in E²PROM 78 to the data collector. After transmission the following message is displayed to prompt the operator to disconnect the dispenser from the modem:

```
[-DISCONNECT RMOD-]
```

This constitutes the Transmission Mode. Once the last data is transmitted and a verification signal is received by the money order dispenser, the dispenser automatically terminates the connection, displays the above disconnect message and exits the Transmission Mode.

As discussed above, an important feature of the present invention is the use of the dot matrix printer 56 which is designed to receive a money order in a transverse direction with respect to the printing of normal indicia thereon. The movement of money orders through the dot matrix printer in a transverse fashion facilities the use of a small dot matrix printer, thereby reducing the overall dimensions of the money order dispenser of the present invention. However, since the money order is passed through the dot matrix printer in a transverse fashion, normal printing of indicia thereon would render the money order unreadable. To overcome this problem, the present invention includes software routines stored in the EPROM's 64 and 66 to "rotate" the alphanumeric characters during printing on the money order. Therefore, since the money orders pass through the dot matrix printer in a transverse fashion, and the characters are rotated under software control, the money order exits from the dispenser in a readable fashion.

Figure 5:
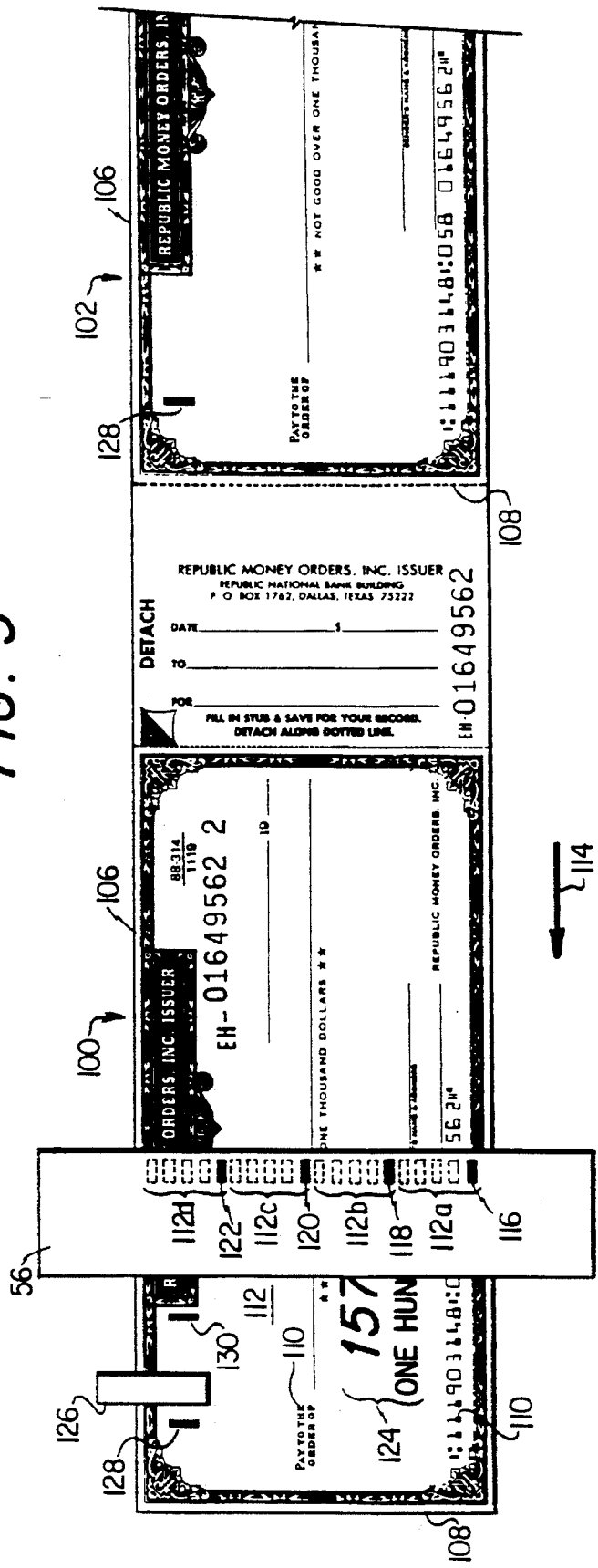
FIG. 5 is a top view of the dot matrix printer incorporated in the dispenser of FIG. 2 detailing the movement of a money order therethrough.

Referring now to FIG. 5, a top view is shown of the movement of a money order through the dot matrix printer 56 of the present invention. Specifically, the continuous fan-folded stack 48 of money order forms includes a money order form 100 currently being printed and a next money order form 102. As seen in FIG. 5, each of the money order forms includes relatively long longitudinal sides 106 and relatively short transverse sides 108. Each money order form is interconnected along the transverse sides 108 thereof. As also seen in FIG. 5, each of the money order forms includes indicia 110 preprinted thereon in a longitudinal direction.

In operation, the pressure feed clamp 54 advances the money order forms 100 and 102 serially through a printing zone 112 by movement of the fan-folded stack in the longitudinal direction as represented by the arrow 114. The dot matrix printer 56 includes printing elements, for example elements 116, 118, 120 and 122, each of which reciprocate transversely to print alphanumeric indicia in four regions of the printing zone 112. Specifically, print element 116 moves transversely through the region 112a of the printing zone 112, print element 118 moves transversely through the printing zone 112b, etc. The dot matrix printer 56 is preferably of the type manufactured by Epson Corporation.

Therefore, as seen in FIG. 5, the dot matrix printer 56 extends transversely across the printing zone 112 for printing variable alphanumeric indicia on the money order forms. It should be appreciated, however, that since the dot matrix printer normally prints indicia in a transverse direction, normal operation of the printer would render the money order forms unreadable. Accordingly, the printer software routine controls the various print elements 116, 118, 120 and 122 to form the variable alphanumeric indicia 124 on the money order forms in the longitudinal direction. Thus the money order forms are output from the money order dispenser in a readable fashion.

According to another important feature of the present invention, the dot matrix printer assembly 44 includes a photocell 126 which is used to sense the presence of first and second code marks 128 and 130, printed on the money order forms. Specifically, the first code mark 128 is preprinted on each money order form for the purpose of ensuring that the money order forms are properly aligned prior to printing. To this end, the photocell 126 generates a first control signal to the digital processor 60 upon reading the first code mark 128, thereby indicating proper alignment of the money order form. Moreover, prior to the printing of the variable alphanumeric indicia 124 on the money order 100, the printing ribbon 58 is actuated to print the second code mark 130. In operation, the photocell 126 must sense the presence of the second code mark 130 prior to printing of the alphanumeric indicia 124. Accordingly, the printing ribbon 58 must be properly located to effect printing of the second code mark 130 before the dot matrix printer 56 is driven to print a money order. This feature of the present invention ensures that "counterfeit" money orders cannot be printed by manipulation of the printing ribbon, or other disablement of the printing device.

The program listings for (1) changing the security inhibit printing code, (2) controlling the keyboard operation as described above with respect to FIG. 4, and (3) accomplishing the printing of "rotated" alphanumeric indicia on a money order are set forth below:

EEPROM DATA AREA

```
                PAGE
;EEPROM DATA LOCATED AT E000H-E3FFH
EPRM       SEGMENT AT 0E000H
;DOWN LOADED STORE INFORMATION
SCRTY      DM         ?              :SECUTITY NUMBER
STACC      DM         ?              :STORE #   MAJOR ACCOUNT
STSTE      DB         ?              :STORE #   STATE
STSUB      DB         ?              :STORE #   SUB ACCOUNT
STDIV      DM         ?              :STORE #   DIVISION
STSTR      DM         ?              :STORE #   STORE
MONTH      DB         ?              :DATE   MONTH
DAY        DB         ?              :DATE   DAY
YEAR       DB         ?              :DATE   YEAR
PHONE      DB         11 DUP(?)      :TELEPHONE NUMBER

USE        DB         ?              :ID USE CODE 0 NO ID NEEDS TO
                                     BE ENTERED
                                     :1-ONE ID PER SHIFT/DAY
                                     :2-ID FOR EVERY TRANSACTION
ID         DB         NID DUP(?)     :IDENTIFICATION NUMBERS

:RMOD STATUS INDICATORS - 0/1
RMODS      DB         ?              :RMOD STATUS - CLOSED/OPEN
MODMS      DB         ?              :MODEM STATUS - DISCNCT/DNCT
CMPPS      DB         ?              :MC PRINTER STATUS -
                                     OK/DISABLED
JRRRS      DB         ?              :JR PRINTER STATUS - OK
                                     DISABLED

RO Assembles 03-06-84              PAGE 1-8

EEPROM DATA AREA

KEYBS      DB         ?              :KEYBOARD STATUS - OK/LOCKED

;DATA DETERMINED AT RUN TIME-STORED HERE TO PRESERVE WHEN POWER
OFF
LOCKC      DB         ?              :ERROR COUNT BEFORE LOCKUP
TRPTR      DB         ?              :TRANSACTION POINTER
TXPTR      DB         ?              :TRASMISSION POINTER
FIDT       DB         NID DUP (?)    :FEE TOTAL PER ID

MCNT       DW         ?              :MO NUMBER TOTAL
MAMT       DD         ?              :MO AMOUNT TOTAL
VCNT       DW         ?              :VP NUMBER TOTAL
VANT       DD         ?              :VP AMOUNT TOTAL
FAMT       DD         ?              :FE AMOUNT TOTAL
VOID       DW         ?              :NUMBER OF VOIDS
TCNT       DW         ?              :TOTAL TRANSACTIONS
TAMT       DD         ?              :TOTAL AMOUNT

:TRNSACTION BUFFER-FILLS UP REST OF EEPROM-ROTATING BUFFER
TRBFRS     DB         ?              :START OF TRANSACTION BUFFER
TRBFRE     DB         ?              :END OF TRANSACTION BUFFER
EPRM       ENDS

:EEPROM DATA LOCATED E4000H-E5FFFH
:DOWN LOADED PROTOCOL INFORMATION
EPRM       SEGMENT AT 0E400H
:$$$NO DATA DEFINED$$$
EPRM       ENDS
SUBTTL     START OF PROGRAM - POWER OF SELF TEST AND
           INITIALIZATION AT FE000H
```

START OF PROGRAM

PAGE

CODE SEGMENT OF AFE00H
START: CLI                    ;DISABLE INTERRUPTS
                              ;TEST FLAGS, REGISTERS,
                              ;    CONDITIONAL JUMPS
       MOV    AH,0D5H         ;SET FLAGS-SF,ZF,AF,PF,CF
       SAHF
       JNS    STERR
       JNZ    STERR
       JNP    STERR
       JNC    STERR
       LAHF
       MOV    CL,5            ;SET CARRY
       SHR    AH,CL
       JNC    STERR
       MOV    AL,40H          ;SET OVERFLOW
       SHL    AL,1
       JNO    STERR
       XOR    AX,AX           ;CLEAR FLAGS
       SAHF
       JS     STERR
       JZ     STERR
       JP     STERR
       JC     STERR
       LAHF
       MOV    CL,5            ;RESET CARRY
       SHR    AH,CL
       JC     STERR
       SHL    AH,1            ;RESET OVERFLOW
       JO     STERR
                              ;TEST REGISTERS WITH ALL ONE'S
                              ;    AND ZERO'S
       MOV    AX,0FFFFH
       STC                    ;SET CARRY - LOOP CONTROL
STRT1: MOV    DX,AX            ;LOOP TO WRITE PATTERN TO ALL
                              ;    REGISTERS
       MOV    BX,DS
       MOV    ES,BX
       MOV    CX,ES
       MOV    SS,CX
       MOV    DX,SS
       MOV    SP,DX
       MOV    BP,SP
       MOV    SI,BP
       MOV    DI,SI
       JNC    STRT2
       XOR    AX,DI           ;END OF FIRST TIME THROUGH
       JNZ    STERR           ;PATTERN NOT ALL ONE'S
       CLC                    ;CLEAR CARRY
       JNC    STRT1           ;REPEAT WTIH ALL ZERO'S
STERR: HLT                    ;POWER ON SELT TEST ERROR
STRT2: OR     AX,DI           ;END OF SECOND TIME THROUGH
       JNZ    STERR           ;PATTERN NOT ALL ZERO'S
                              ;TEST RAM WITH FF,AA,55,01,00
                              ;    PATTERNS
       SUB    AX,AX           ;INITIALIZE ES & DS
       MOV    ES,AX
       MOV    DS,AX
       SUB    DI,DI
       MOV    BX,LMCSD        ;COMPUTE UPPER LIMIT OF RAM
       MOV    CL,4
       SHL    BX,CL           ;CANNOT BE > OFFFFH
       OR     BX,00ZEH        ;RAM COUNT
       MOV    AX,0FFFFH
       MOVE   DX,55AAH

START OF PROGRAM

CLD                    ;INCREMENT FLAG
       MOV    CX,BX           ;COUNT
       REP    STOSB           ;FILL RAM WITH FIRST PATTERN

```
STRT3:      DEC     DI              ;POINT TO LAST BYTE
            STD                     ;DECREMENT FLAG
STRT4:      MOV     SI,DI
            MOV     CX,BX
STRT5:      LODSB                   ;READ PATTERN STORED
            XOR     AL,AH           ;TEST IF OK
            JNE     STERR           ;TEST NOT OK
            CMP     AH,0
            JE      STRT6           ;ZERO PATTERN
            MOV     AL,DL
            STOSB                   ;WRITE NEXT PATTERN
STRT6:      LOOP    STRT5           ;CONTINUE UNTIL ALL OF RAM TEST
            CMP     AH,0
            JE      STRT7           ;RAM TEST COMPLETE
            MOV     AH,AL           ;ROTATE PATTERN
            XCHG    DH,DL
            CLD                     ;INCREMENT FLAG
            INC     DI              ;POINT TO START BYTE
            JZ      STRT4           ;READ/WRITE FORWARD
            DEC     DI              ;READ/WRITE BACKWARD
            MOV     DX,1            ;00 AND 01 PATTERN
            JMP     STRT3
                                    ;INITIALIZE SEGMENT REGISTER & STACK
STRT7       MOV     AX,DATA
            MOV     DS,AX
            MOVE    AX,EPRM
            MOV     ES,AX
            MOVE    AX,STACK
            MOV     SS,AX
            MOV     SP,OFFSET STACKT
                                    ;INITIALIZE THE CHIP SELECT
                                    CONTROLLER
            MOV     DX,LMCSR        ;LOWER MEMORY CHIP SELECT
            MOVE    AX,LMCSD        ;16K at 0 - 3FFFH
            OUT     DX,AX
            MOV     DX,PACSR        ;PERIPHERAL CHIP SELECT
            MOV     AX,PACSD
            OUT     DX,AX
            MOV     DX,MMCSR        ;MID-RANGE MEMORY CHIP SELECT
            MOV     AX,MMCSD        ;16K AT E0000H
            OUT     DX,AX
            MOV     DX,MPCSR        ;MID-RANGE MEMORY SIZE
            MOV     AX,MPCSD
            OUT     DX,AX
                                    ;INITIALIZE 8155 - A
            MOV     DX,A8155CS      ;CONTROLS CLOCK, KEYBOARD, DISPLAY
            MOV     AL,A8155CD      ;PORT A,B,C OUTPITS, NO TIMER
            OUT     DX,AL
            INC.    DX              ;PORT A ADDRESS
            MOV     AL,A8155DA      ;ALL OUTPUTS HIGH
            OUT     DX,AL
            INC     DX              ;PORT B ADDRESS
            OUT     DX,AL
            INC     DX              ;PORT C ADDRESS
            OUT     DX,AL
            INC     DX              ;TIMER LOW COUNT ADDRESS
            MOV     AL,A8155TD      ;NO TIME
            OUT     DX,AL
            INC     DX              ;TIMER HIGH COUNT ADDRESS
START OF PROGRAM
            OUT     DX,AL

;INITIALIZE 8155 - B
            MOV     DX,B8155CS      ;MONITORS DIP SWITCHES
            MOV     AL,B8155CD      ;PORT A INPUTS, B&C OUTOUTS, NO TIMER
            OUT     DX,AL
            INC     DX              ;PORT A ADDRESS
            MOV     AL,B8155DA      ;ALL INPUTS HIGH
            OUT     DX,AL
            INC     DX              ;PORT B ADDRESS
            OUT     DX,AL           ;ALL OUTPUTS HIGH
```

```
            INC         DX
            OUT         DX,AL
            INC         DX              ;TIMER LOW COUNT ADDRESS
            MOV         AL,B8155TD      ;NO TIME
            OUT         DX,AL
            INC         DX              ;TIMER HIGH COUNT ADDRESS
            OUT         DX,AL
;$$$NO PROGRAM YET$$$                   ;INITIALIZE THE DMA CONTROLLER
;$$$NO PROGRAM YET$$$                   ;INITIALIZE THE TIME CONTROLLER
;$$$NO PROGRAM YET$$$                   ;INITIALIZE THE INTERRUPT CONTROLLER
            CALL        CLKINT          ;INITIALIZE CLOCK
            CALL        DSPINT          ;INITIALIZE DISPLAY
            CALL        JPRTINT         ;INITIALIZE JOURNAL PRINTER
            CALL        CPRTINT         ;INITIALIZE CHECK PRINTER
                                        ;SET UP INTERRUPT VECTOR TABLE
            MOV         ES:NMIPTR,OFFSET NMI
            MOV         ES:NMIPTR+2, CODE
            MOV         ES:TMROPTR,OFFSET TMRO
            MOV         ES:TMROPTR+2, CODE
            MOV         ES:DMAOPTR, OFFSET DMA0
            MOV         ES:DMAOPTR+2,CODE
            MOV         ES:DMA1PTR,OFFSET DMA1
            MOV         ES:DMA1PTR+2,CODE
            MOV         ES:INTOPTR,OFFSET INTO
            MOV         ES:INTOPTR+2,CODE
            MOV         ES:CLCKPTR,OFFSET CLCK
            MOV         ES:CLCKPTR+2,CODE
            MOVE        ES:INT2PTR,FFSET INT2
            MOV         ES:INT2PTR+2,CODE
            MOV         ES:INT3PTR,OFFSET INTO
            MOV         ES:INT3PTR+2,CODE
            MOV         ES:TMR1PTR,OFFSET TMR1
            MOV         ES:TMR1PTR+2,CODE
            MOV         ES:TMR2PTR,OFFSET TMR2
            MOV         ES:TMR2PTR+2,CODE

CALL        DSPCLR          ;CLEAR DISPLAY
            CLD                         ;FILL KEYBOARD BUFFER WITH SPACES
            MOV         DI,OFFSET KBFR
            MOVE        CX,SKBFR
            MOV         AL,20H
    REP     STOSB
            STI                         ;ENABLE INTERRUPTS
STRT9:      CALL        RMDCK           ;CHECK RMOD
            CALL        KEYB            ;SCAN KEYBOARD
            CALL        PWRCK           ;CHECK FOR POWER DOWN
            JMP         STRT8           ;LOOP FOREVER
CODE        ENDS

;POWER ON RESET VECTOR - LOCATED AT OFFFFF0H
RESET       SEGMENT AT OFFFFH

RO Asembler 03-06-84    Page 1-12

START OF PROGRAM

MOV         DX,UMCSR        ;UPPER MEMORY CHIP SELECT
        MOV         AX,UMCSD        ;BK AT FE000H
        OUT         DX,AX
        JMP         FAR PTR START
        DB          'RM00'
RESET ENDS
        END

CRO Asembler 03-05-84   Page 1-3

INT VECTOR 3 - NON MASKABLE INTERRUPT - RMOD INTERLOCK

Page

;NMI        PROCEDURE-REENTRANT, NONMASKABLE INTERRUPT
        ;               ENTRY-INTERRUPT 2
        ;               EXIT-RMODS=1 - OPEN
```

```
             PUBLIC NMI
NMI          PROC         NEAR
             PUSH         BP
             MOV          BP,SP       ;ESTABLISH BASE POINTER
             PUSH         BX
             PUSH         AX
             PUSHF
             MOV          BX,OFFSET RMODS  ;WRITE RMOD OPEN
                                                 INDICATOR
             MOV          AL,01H
             CALL         WEEPRM      ;WRITE TO EEPROM ONE
                                                 BYTE
             POPF
             POP          AX
             POP          BX
             POP          BP
             IRET
NMI          ENDP
      SUBTTL              INTO - INTERRUPT 0
```

CRO Assembler 03-05-84        Page 1-1
STERS

```
             TITLE        RMDCK - CHECK RMOD STATUS REGIS
             STERS
             PAGE         66,132
      CGROUP GROUP        CODE, CONST, RESET
      CGROUP GROUP        INTV, STACK,D ATA
      EGROUP GROUP        PRM

EPRM   SEGMENT      PUBLIC EPRM
             EXTRN        RMODS:BYTE, CKPRS:BYTE
             EXTRN        JRPRS:BYTE, KEYBS:BYTE, LCCKC:BYTE
             EXTRN        LOCK:BYTE
      EPRM   ENDS

CODE   SEGMENT PUBLIC CODE
      ASSUME CS:CGROUP, DS:DGROUP, SS:DGROUP,ES:EGROUP
             EXTRN        WEEPRM:NEAR

;RMDCK PROCEDURE - CHECK ALL VITAL RMOD STATUS REGISTERS
      ;        IF RMOD WAS OPENED                         - RMODS=1 OR
      ;        IF ERROR COUNT EQUALS MAXIMUM              - LOCKC=LOCK
      ;        THEN MONEY ORDER PRINTER IS DISABLED       - CKPRS=1AND
      ;             JOURNAL PRINTER IS DISABLED           - LRPRS=1AND
      ;             KEYBOARD IS LOCKED                    - KEYBS=1
             PUBLIC RMDCK
      RMDCK  PROC         NEAR
             XOR          AL,AL
             TEST         RMODS,01H   ;TEST RMOD FOR OPEN
             JNZ          RMDCK1      ;OPEN
             MOV          AH,LOCKC    ;ERROR COUNT
             CMP          AH,LOCK     ;MAXIMUM ERROR COUNT
             JB           RMDCK2      ;MAXIMUM ERROR COUNT
                                           NOT REACHED
      RMDCK1:INC          AL
      RMDCK2:MOV          BX,OFFSET CKPRS ;MONEY ORDER PRINTER-
                                                 0=ENABLE,1=DISABLE
             CALL         WEEPRM
             INC          BX          ;JOURNAL PRINTER - 0=ENABLE,1=DISABLE
             CALL         WEEPRM
             INC          BX          ;KEYBOARD       - 0=ENABLE,1=LOCKED
             CALL         WEEPRM
             RET
      RMDCK  ENDP
      CODE   ENDS
             END
```

RO Assembler 03-06-84        Page 1-1

```
             TITLE        KEYB - KEYBOARD MODULE
             Page         66,132

DATA   SEGMENT OUBLIC 'DATA'
```

```
        EXTRN   MOVP:BYTE   TOTS:BYTE   DSPR:BYTE    SHFT:BYTE  FEEC:BYTE
        EXTRN   KEY:BYTE    KEYP:BYTE   KEYT:BYTE    KEYD:BYTE
        EXTRN   KNDG:BYTE   KCMD:BYTE   KPCMD:BYTE
        EXTRN   KENTN:BYTE  KENTP:WORD
        EXTRN   KNBR:BYTE   KFLD:BYTE   KLCK:BYTE
        EXTRN   KDSP:BYTE   KONT:BYTE   KTPE:BYTE
        EXTRN   KLLMT:DWORD             KULMT:DWORD
        EXTRN   KPTR:DWORD  KBIN:DWORD  KBPTR:DWORD

EXTRN   CHR:BYTE    CMIN:BYTE   CSEC:BYTE
        EXTRN   CSCRTY:WORD
        EXTRN   CSACC:DWORD             CXNBR:DWORD  CSCHK:BYTE
        EXTRN   CID:BYTE    CIDL:BYTE
        EXTRN   CCNT:WORD   CAMT:DWORD  DFEE:DWORD   CTOT:DWORD
        EXTRN   DFIDT:DWORD
        EXTRN   CMCNT:WORD  CMAMT:DWORD
        EXTRN   CVCNT:WORD  CVAMT:DWORD
        EXTRN   CTCNT:WORD  CTAMT:DWORD
        EXTRN   KBFR:BYTE   DBFR:BYTE   SCRTCH:BYTE
DATA    ENDS

EPRM    SEGMENT PUBLIC 'EPRM'
        EXTRN   SCRTY:WORD
        EXTRN   STACC:WORD  STSTE:BYTE  STSUB:BYTE   STDIV:WORD  STSTR:WORD
        EXTRN   MONTH:BYTE  DATE:BYTE   YEAR:BYTE
        EXTRN   PHONE:BYTE
        EXTRN   USE:BYTE                ID:BYTE
        EXTRN   FEELMT:DWORD            FEEAMT:DWORD
        EXTRN   MCNTC:WORD              MCNTM:WORD
        EXTRN   MAMTC:DWORD             MAMTM:DWORD
        EXTRN   VCNTC:WORD              VCNTM:WORD
        EXTRN   VAMTC:DWORD             VAMTM:DWORD
        EXTRN   BLANKS:BYTE             TRANS:BYTE   LOOK:BYTE
        EXTRN   BSACC1:WORD   BSNBS1:DWORD   BSCHK1:BYTE
        EXTRN   ESACC1:WORD   ESNBR1:DWORD   ESCHK1:BYTE
        EXTRN   BSACC2:WORD   BSNBR2:DWORD   BSCHK2:BYTE
        EXTRN   ESACC2:WORD   ESNBR2:DWORD   ESCHK2:BYTE
        EXTRN   RMODS:BYTE    MODMS:BYTE     CKPRS:BYTE
        EXTRN   JRPRSLBYTE    KEYBS:BYTE     LOCKS:BYTE
EPRM    ENDS

CODE    SEGMENT PUBLIC 'CODE'
        EXTRN   PWRON:NEAR
        EXTRN   WEEPRM:NEAR
        EXTRN   TRNS:NEAR
        EXTRN   DISP:NEAR   JPRT,NEAR   CPRT:NEAR
        EXTRN   ASCBN:NEAR  BNASC:NEAR
        EXTRN   DPCMP:NEAR  DPADD:NEAR  DPSUB:NEAR   DPMUL:NEAR  DPDIV:NEAR
CODE    ENDS

DGROUP  GROUP       CODE, CONST, RESET
        DGROUP  GROUP       INIV. STACK DATA

CODE SEGMENT PUBLIC 'CODE'

RO Assembler 03-06-84         Page 1-2

ASSUE CS:CGROUP, DS:GROUP, SS:DGROUP, ES:EGROUP

;KEYBOARD CONSTANTS

NID     EQU     20          ;NUMBER OF IDENTIFICATION CODES
NFEE    EQU     20          ;NUMBER OF FEES
NTR     EQU     16          ;NUMBER OF TRANSACTIONS PER
                             CUSTOMER/VENDOR
SKBFR   EQR     16          ;SIZE OF KEYBOARD BUFFER
SDBFR   EQU     16          ;SIZE OF DISOLAY BUFFER
KBDCS   EQU     300H        ;KEYBOARD COMMAND/STATUS ADDRESS
KBDCD   EQU     00DH        ;PORT A & C OUTPUT, B INPUT
KBDRS   EQU     0FBH        ;ROW 1 SELECT
KBDRM   EQU     00FH        ;READ MASK
KNKEY   EQU     24          ;NUMBER OF KEYS
KNROW   EQU     6           ;NUMBER OR ROWS
```

```
KNCOL    EQU    4            ;NUMBER OF COLUMNS
KDBNC    EQU    4            ;BEBOUNCE CONSTANT
KBYTE    EQU    1            ;BYTE ENTRY
KWORD    EQU    2            ;WORD ENTRY
KDWRD    EQU    3            ;DWORD ENTRY
KREAL    EQU    4            ;REAL ENTRY
KALPHA   EQU    5            ;ALPHA ENTRY
KEY0     EQU    00H          ;0
KEY1     EQU    01H          ;1
KEY2     EQU    02H          ;2
KEY3     EQU    03H          ;3
KEY4     EQU    04H          ;4
KEY5     EQU    05H          ;5
KEY6     EQU    06H          ;6
KEY7     EQU    07H          ;7
KEY8     EQU    08H          ;8
KEY9     EQU    09H          ;9
KEYEN    EQU    0AH          ;ENTER
KEYVD    EQU    0BH          ;VOID
KEYST    EQU    0CH          ;START
KEYNF    EQU    0DH          ;NO FEE
KEYID    EQU    0EH          ;ID
KEYMO    EQU    0FH          ;MONEY ORDER
KEYTX    EQU    10H          ;TRANSMIT
KEYDF    EQU    11H          ;DEFINE
KEYVP    EQU    12H          ;VENDOR PAYMENT
KEYTO    EQU    13H          ;TOTAL
KEYLD    EQU    14H          ;LOAD
KEYDY    EQU    15H          ;DAY/SHIFT
KEYDS    EQU    16H          ;DISPLAY
KEYBR    EQU    17H          ;PRINT
KEYDATA  DB     KEYLD        ;KEY CODE TABLE
         DB     KEYDY
         DB     KEYDS
         D      KEYPR
         DB     KEYTX
         DB     KEYDF
         DB     KEYBP
         DB     KEYTO
         DB     KEYST
         DB     KEYNF
         DB     KEYID
         DB     KEYMO
         DB     KEY6
         DB     KEY3
         DB     KEYEN
```

CRO Assembler 03-06-84                Page 1-3

```
         DB     KEY8
         DB     KEY5
         DB     KEY2
         DB     KEY0
         DB     KEY7
         DB     KEY4
         DB     KEY1
         DB     KEYVD
KEYJT    DW     KENT         ;KEYBOARD JUMP TABLE
         DW     KVOID
         DW     KSTRT
         DW     KNFEE
         DW     KID
         DW     KMO
         DW     KTRNS
         DW     KDEFN
         DW     KVP
         DW     KTOTL
         DW     KLOAD
         DW     KSHFT
         DW     KDISP
         DW     KPRNT
;DATA ENTRY AND DISPLAY TABLES
;NUMBER OF DATA ITEMS TO BE ENTERED
```

```
            :16 CHARACTER DISPLAY
            :NUMBER OF POSSIBLE ENTRIES PER DATA ITEM
            :NUMBER OF FIELDS
            :NUMBER OF ERRONEOUS ENTRIES BEFORE RMOD LOCKS
            :DISPLAY START OF ENTRY - 0=NO DISPLAY
            :NUMBER OF CHARACTERS PER DISPLAY - 0=NONE ALLOWED
            :TYPE OF DATA - 1=BYTE, 2=WORD, 3=DWORD, 4=REAL, 5=ALPHA
            :LOWER LIMIT - 0=NO LIMIT CHECK, FFFFFFFF=CHECK AGAINST ARRAY
                IN UPPER LIMIT
            :UPPER LIMIT
            :DATA STORAGE POINTER
KSTRTN      EQU     2                       :START OF DAY KEYBOARD DATA
KSTRTD      DB      'ID              ',20,1,5

DB      14,3,1
            DD      0FFFFFFFFH,ID
            DD      CIDL
            DB      'BEG#            ',1,3,0

DB      6,3,2
            DD      0FFFFFFFFH,BSACC1
            DD      CSACC
            DB      9,6,3
            DD      0FFFFFFFFH,DBNBR1
            DD      CSNBR
            DB      16,12,1
            DD      0FFFFFFFFH,BSCHK1
            DD      CSCHK
            DB      0,5,2

Assembler 03-06-84          Page 1-4

DD      0FFFFFFFFH,SCRTY
            DD      CSCRTY'      DB
'DIAL TELELPHOHE #',0,0,0

DB      0,0,0
            DD      0,0

DD      TRNS
            DB      'DISCONNECT RMOD ',0,0,0

DB      0,0,0
            DD      0,0

DD      0
EFNN        EQU     19                      :DEFINE KEYBOARD DATA-ENTERED BY
                                             MANAGER
EFND        DB      'SECURITY#       ',1,1,0

DB      0,5,2
            DD      0,0

DD      SCRTY
            DB      'ST              ',1,5,0

DB      3,3,2
            DD      0,0

DD      STACC
            DB      6,2,1
            DD      0,0

DD      STSTE
            DB      8,2,1
            DD      0,0

DD      STSUB
            DB      10,3,2
            DD      0,0

DD      STDIV
            DB      13,4,2
            DD      0,0
```

```
        DD      STSTR
        DB      'DATE       /  / ',1,3,0
        DD      MONTH
        DB      12,2,1
        DD      1,31
```

O Assembler 03-06666-84         Page 1-5

```
        DD      DAY
        DB      15,2,1
        DD      0,0

DD      YEAR
        DB      'TIME       :  : ',1,3,0

DB      9,2,1
        DD      0,24

DD      CHR
        DB      12,2,1
        DD      0,59

DD      CMIN
        DB      15,2,1
        DD      0,59

DD      CSEC
        DB      'PHNE        ',1,1,0

DB      6,11,5
        DD      0,0

DD      PHONE
        DB      'ID USE      ',1,1,0

DB      16,1,1
        DD      0,2

DD      USE
        DB      'ID          ',20,1,0

DB      14,3,1
        DD      0,255

DD      ID
        DB      'FE          ',20,2,0

DB      2,3,4
        DD      0,99999999

DD      FEELMT
        DB      12,4,4
        DB      'CST MO#     ',0,1,0
```

D Assembler 03-06-84            PAGE 1-6

```
        DB      12,5,2
        DD      0,0

DD      MCNTC
        DB      'MCH MO#     ',0,1,0

DB      12,5,2
        DD      0,0

DD      MCNTM
        DB      'CST MO$     ',0,1,0

DB      8,8,4
        DD      0,0
```

```
              DD        MAMTC
              DB        'MCH MO$         ',0,1,0

DB        8,8,4
              DD        0,0

DD        MAMTM
              DB        'VND  CK#        ',0,1,0

DB        12,5,2
              DD        0,0

DD        VCNTC
              DB        'MCH  CK#        ',0,1,0

DB        12,5,2
              DD        0,0

DD        VCNTM
              DB        'VND  CK$        ',0,1,0

DB        8,8,4
              DD        0,0

DD        MAMTC
              DB        'MCH  CK$        ',0,1,0

DD              0.0

DD        VAMTM

RO Assembler 03-06-84              Page 1-7

DB        'WARN # BLANKS   '0,1,0

DB        15,2,1

DD        0,0
              DB        'WARN # TRANS    '0,1,0

DB        15,2,1
              DD        0,0

DD        TRANS
              DB        'LOCK # ERRORS   '0,1,0

DB        15,2,1
              DD        0,0

DD        LOCK
KLOADN        EQU       3
KLOADD        DB        'SECURITY #      '1,1,5

DB        0,5,2
              DD        0FFFFFFFFH,SECRTY
              DD        CSCRTY
              DB        'BEG#            '1,3,0

DB        6,3,2
              D         0FFFFFFFFH,STACC
              DD        BSACC2
              DB        9,6,3
              DD        0,0

DD        BSNBRS2
              DB        16,1,1
```

```
              DD       BSCHK2
              DB       'END#'           '1,3,0

DB       6,3,2
              DD       0FFFFFFFFH,STACC
              DD       SACC2
              DB       9,6,3
              DD       0,0
RO Assembler 03-06-84           PAGE 1-9

KEYBOARD MONITOR PRCEDURE

PAGE
;KEYBOARD MONITOR PROCEDURE
              PUBLIC   KEYB
KEYB          PROC     NEAR
              MOV      AL,KEYBS         ;$$$SECURITY CHECK$$$
              XDR      AL,AL
              JNZ      KEYB0            ;$$$KEYBOARD LOCKED$$$
              CALL     KEYSC            ;SCAN KEYBOARD FOR KEY
                                         DEPRESSED
              CMP      AL,KNKEY
              JL       KEYB1
KEYB0:        RET                       ;NO KEY OR NON-EXIST KEY
KEYB1:        XDR      CX,CX
              CMP      AL,10
              JL       KNMBR            ;NUMBER 0-9
              XCHG     KCMD,AL          ;ROTATE COMMANDS
              MOV      KPCMD,AL         ;SAVE PREVIOUS COMMAND
              SUB      AL,10
              MOV      CL,AL
              PUSH     CX               ;SAVE JUMP TABLE INDEX
              MOV      CL,KCNT          ;NUMBER OF DIGITS ALLOWED
              CMP      KNDG,0           ;NUMBER OF DIGITS ENTERED
              JZ       KEYB4            ;NO DATA ENTERED
              MOV      DI,KPTR          ;OFFSET OF DATA STORAGE IF ANY
              MOV      SI,OFSET KBIN    ;TEMPORARY BINARY STORAGE
              MOV      BX,OFFSET SCRTCH
              MOV      AX,KBPTR         ;OFFSET OF DATA ENTERED
              CMP      KTPE,KALPHA      ;CHECK DATA TYPE
              JE       KEYB2            ;ALPHA
              PUSH     AX               ;SAVE KEYBOARD BUFFER ADDRESS
              PUSH     SI
              PUSH     BX
              PUSH     CX
              CALL     ASCBN            ;CONVERT TO BINARY
              PUSH     SI               ;POINTER TO CONVERTED BINARY
                                         NUMBER
              MOV      AX,OFFSET KLLMT
              PUSH     AX               ;LOWER LIMIT
              CALL     DRCMP            ;COMPARE
              SAL      AX,1
              JC       KEYB5            ;ERROR-NUMBER/LOWER LIMIT
              MOV      AX,OFFSET KULMT
              PUSH     AX               ;UPPER LIMIT
              PUSH     SI               ;CONVERTED BINARY NUMBER
              CALL     DPCMP            ;COMPARE
              SAL      AX,1
              JC       KEYB5            ;ERROR-UPPER LIMIT/NUMBER
              MOV      CL,KTPE
              CMP      CL,KDWRD
              JNE      KEYB2
              INC      SX               ;ADJUST DWORD COUNT
KEYB2:        MOV      AX,DS            ;TRANSFER DATA ENTERED
              CMP      KPTR+2,AX
              JE       KEYB3            ;DESTINATION=EE PROM
              MOV      BX,KPTR
KEYB2A        LODSB
              CALL     WEEPRM           ;DESTINATION=EE PROM
              INC      BX
              LOOP     KEYB2A
```

```
KEB13:    OR        AA,...
          JE        KEYB4           ;NO TRANSFER, LEAVE IN KBIN
REP       MOVSB
```

RO Assembler 03-006-84          Page 1-10

KEYBOARD MONITOR PROCEDURE

```
KEYB4:    POP       BX              ;RETRIEVE JUMP TABLE INDEX
          SHL       BX,1            ;COMPUTE JUMP ENTRY
          JMP       KEYJT [BX]      ;PROCESS KEY
KEYB5:    POP       BX
          CALL      KERR
          RET
KNMBR:    ADD       AL,30H          ;CONVERT TO ASCII
          CLD
          MOV       SI,OFFSET KBFR+1
          MOV       DI,OFFSET KBFRR
MOV       CX,SKBFR-1
REP       MOVSB                     ;ROTATE KBFR TO LEFT
          STOSB                     ;ADD NEW CHARACTER TO RIGHT
          INC       KNDG            ;DIGIT COUNT
          CMP       KDSP,0          ;CHECK FOR DISPLAY
          JZ        KNMBR3          ;NO DISPLAY ALLOWED
          MOV       DI,OFFSET DBFR-1
          XOR       CH,CH
          MOV       CL,KDSP
          ADD       DI,CX
          MOV       SI,OFFSET KBFR+SKBFR
          MOV       CL,KCNT
          SUB       SI,CX
          MOV       KBPTR,SI        ;SAVE KBFR OFFSET
          PUSH      DI              ;SAVE START OF DISPLAY
          PUSH      CX              ;SAVE NUMBER OF CHARACTERS IN
                                    ;DISPLAY
          MOV       BL,KTPE         ;TUPE OF ENTRY BEING PROCESSED
          CMP       BL,KREAL
          JNE       KNMBR1
          POP       CX
          INC       CX              ;ADD DECIMAL POINT TO COUNT
          PUSH      CX
          SUB       CX,3            ;REAL ENTRY
KNMBR1:
REP       MOVSB                     ;MOVE KBFR TO DBFR
          CMP       BL,KREAL        ;CHECK FOR REAL ENTRY
          JNE       KNMBR2
          MOV       AL,','          ;REAL ENTRY
          STOSB
          MOV       CL,2            ;MOVE FRACTION
REP       MOVSB
KNMBR2:   MOV       AK,DKSP         ;START OF MESSAGE (1-16)
          MOV       AL,05H          ;CURSOR LINE, ON
          PUSH      AX
          CALL      DISP
KNMBR3:   RET
KENTR:    NGP                       ;ENTER KEY - $$$NO PROGRAM$$$
KVOID:    MOV       AH,MOVP         ;VOID KEY
          MOV       AL,TOTS         ;TOTAL STATUS
          CMP       AH,1
          JE        KOID1           ;MONEY ORDER VOID
          CMP       AH,2
          JE        KVPOID2         ;VENDOR PAYMENT VOID
          CALL      KERR            ;ERROR-CLEAR ENTRY & BEEP
          RET
KVOID2:   MOV       SI,OFFSET CVCNT ;VENDOR PAYMENT VOID
          MOV       DI,OFFSET CVAMT
                                    ;CAMT,CFEE INDEX
KVOID3:   BX,BX
```

RO Assembler 03-06-84           Page 1-11

KEYBOARD MONITOR PROCEDURE

```
          MOV       CX,CCNT         ;# OF MO/VP ENTERED
          CMP       AL,0
```

```
              JNE       KVOID4              ;TOTAL KEY DEPRESSED, VOID
                                            ALL
              MOV       AL,4                ;VOID LAST ENTRY
              DEC       CL
              MUL       CL
              MOV       BX,AX
              MOV       CL,1
KVOID4:       PUSH      CX                  ;# OF ENTRIES TO BE VOIDED
KVOID5:       DEC       CCN                 ;REDUCE COUNT
              DEC       CVCNT
              CMP       TOTS,1
              JNZ       KVOID6
              DEC       CTCNT               ;REDUCE TOTAL TRANSACTIONS
KVOID6:       LOOP      KVOID5
              POP       CX
              PUSH      CX
              PUSH      DI                  ;SAVE CMAMT/CVAMT OFFSET
KVOID7:       MOV       SI,OFFSET CAMT
              ADD       SI,BX
              MOV       DI,OFFSET CTOT
              PUSH      SI
              PUSH      DI
              CALL      DPSUB               ;CTOT=CTOT-MO/VP
              CMP       MOVP,1
              JNE       KVOID9
              PUSH      SI                  ;REDUCE FEES
              CMP       TOTS,0
              JE        KVOID8
              MOV       SI,OFFSET CFEE      ;SUBTRACT FEE FROM CTOT
              ADD       SI,CX
              PUSH      SI
              PUSH      DI
              CALL      DPSUB               ;CTOT=CTOT-CFEE
KVOID8:       XOR       AX,AX               ;ZERO FEE
              MOV       [SI],AX
              MOV       [SI+2],AX
              POP       SI
KVOID9:       POP       DI
              POP       SI
              PUSH      DI
              CALL      DPSBU               ;CMAMT/CVAMT=CMAMT/CVAMT-MO/VP
              PUSH      DI
              CMP       TOTS,1
              JNZ       KVOID10
              MOV       DI,OFFSET CTAMT     ;REDUCE TOTAL AMOUNT
              PUSH      SI
              PUSH      DI
              CALL      DPSUB
KVOID10:      POP       DI
              XOR       AX,AX
              MOV       [SI],AX             ;ZERO CAMT
              MOV       [SI+2],AX
              INC       BX
              INC       BX
              JZ        KSTRT1              ;SECOND START KEY
              CALL      PWRON               ;POWER ON
              RET

RO Assembler 03-06-84                       Page 1-12

KEYBOARD MONITOR PROCEDURE

KSTRT1:       MOV       AL,KSTRTN           ;START DATA
              MOV       SI,OFFSET KSTRTD
              CALL      KINIT               ;INITIALIZE KEYBOARD AND
                                            DISPLAY VARIABLES
              RET
KNFEE:        MOV       FEEC,1              ;NO FEE KEY - FECC=1
              RET
KID:          MOV       SI,OFFSET KBIN      ;ID KEY
              LODSB
              MOV       CID,AL
              PUSH      ES                  ;CHECK FOR VALID ID
              MOV       AX,EPRM
```

```
             MOV     DI,OFFSET ID        ;EEPROM ADDRESS
             MOV     CX,NID              ;NUMBER OF IDS
             REPNE   SCASB
             POP     ES
             JB      KID1
             MOV     CID,0               ;ZERO CURRENT ID
             CALL    KERR                ;ERROR-WIPE OUT ENTRY AND
                                          BEEP
KID1:        RET                         ;MATCH FOUND
KMO:         MOV     SI,OFFSET KBIN      ;MONEY ORDER KEY
             MOV     DI,OFFSET CTOT
             PUSH    SI
             PUSH    DI
             CALL    DPADD               ;CTOT=CMAMT+AMT ENTERED
             MOV     DI,OFFSET CMAMT
             PUSH    SI
             PUSH    DI
             CALL    DPADD               ;CMAMT=CMAMT+AMT ENTERED
             PUSH    ES
             MOV     AX,EPRM
             MOV     ES,AX
             MOV     DI,OFFSET MONTC     ;EEPROM ADDRESS
             MOV     AX,CCNT
             CMP     AX,NTR              ;CHECK NUMBERS
             JGE     KMOE                ;MONEY ORDERS EXCEEDED PER
                                          SYSTEM
             CMP     AX,ES:WORD PTR[DI]
             JGE     KMOE                ;MONEY ORDERS EXCEEDED PER
                                          MACHINE
             MOV     SI,OFFSET CTOT      ;CHECK AMOUNT PER CUSTOMER
             ADD     DI,2
             PUSH    SI
             PUSH    DI
             CALL    DPCMP               ;COMPARE TWO DOUBLE
                                          PRECISION NUMBERS
             CMP     AL,1
             JE      KMO4                ;CTOT MAX AMT PER CUSTOMER
             MOV     SI,OFFSET CMAMT     ;CHEC AMOUNTS PER MACHINE
             ADD     DI,4
             PUSH    SI
             PUSH    DI
             CALL    DPCMP               ;COMPARE TWO DOUBLE
                                          PRECISION NUMBERS
             CMP     AL,1
KMOE:        POP     ES                  ;KEYBOARD ERROR
             CALL    KERR                ;ERROR - CLEAR ENTRY & BEEP

RO Assembler 03-06-84              Page 1-13

KEYBOARD MONITOR PROCEDURE

KMO0:        MOV     MOVP,1              ;MO/VP INDICATOR
             INC     CONT
             INC     CMONT
             MOV     AL,4
             MUL     BL
             MOV     BX,AX               ;CAMT & CFEE INDEX
             MOV     AX,KBIN             ;LOW BYTES OF MO
             MOV     CAMT[BX],AX
             MOV     AX,KBIN+2           ;HIGH BYTES OF MO
             MOV     CAMT[BX],AX
             MOV     AL,FEEC             ;CHECK IF FEE IS TO BE
                                          COMPUTED
             CMP     AL,0
             JE      KMO3                ;NO FEE
             PUSH    ES
             MOV     AX,EPRM
             MOV     ES,AX
             MOV     SI,OFFSET KBIN      ;FIND FEE
             MOV     DI,OFFSET FEELMT-9
             MOV     CX,NFEE
```

```
KMO1:   ADD     DI,B                    ;$$$ORDER CHANGED$$$
        PUSH    SI
        PSUH    DI                      ;$$$WRONG SEGMENT$$$
        CALL    DPCMP                   ;COMPARE TWO DOUBLE
                                        PRECISION NUMBERS
        CMP     AX,1
        JNE     KMO2                    ;FEE FOUND-MONEY ORDER
                                        $<=$BREAKPOINT
        LOCP    KMO1                    ;NEXT FEE
KMO2:   ADD     DI,4                    ;FEE ADDRESS
        MOV     AX,ES:WORD PTR[DI]
        MOV     CFEE[BX],AX
        ADD     DI,2
        MOV     AX,ES:WORD PTR[DI]
        MOV     CFEE+2OBX1,AX
        POP     ES
KMO3:   RET
KMO4:   POP     ES                      ;AMOUNTS EXCEEDED-SUBTRACT
                                        LAST AMOUNTS
        MOV     SI,OFFSET KBIN
        MOV     DI,OFFSET CTOT
        PUSH    SI
        PUSH    DI
        PUSH    SI
        CALL    DPSUB                   ;CTOT=CMAMT--AMT ENTERED
        PUSH    ES
        CALL    DPSUB                   ;CMAMT=CMAMT-AMT ENTERED
        PUSH    ES
        JMP     KMOE                    ;ERROR
KTRNS:  MOV     AL,KTRNSN               ;TRANSMIT KEY
        MOV     SI,OFFSET KTRNSD
        CALL    KINIT                   ;INITIALIZE KEYBOARD &
                                        DISPLAY VARIABLES
        RET
KDEFN:  MOV     AL,KDEFNN               ;DEFINE KEY
        MOV     SI,OFFSET KDEFND
        CAL     KINIT                   ;INITIALIZE KEYBOARD &
                                        DISPLAY VARIABLES
        MOV     DI,OFFSET CTOT          ;ZERO CURRENT TOTAL
        XDR     AX,AX
        STOSW

RO Assembler 03-06-84                   Page 1-14

KEYBOARD MONITOR PROCEDURE

STOSW
        MOV     AL,MOVP
        JE      KTOTL6                  ;DISPLAY OR PRINT TOTALS
        CMP     AL,2
        JE      KTOTL3                  ;VENDOR PAYMENT TOTAL
        CMP     AL,1
        JE      KTOTL1                  ;MONEY ORDER TOTAL
        CALL    KERR
        RET
KTOTL1: MOV     CX,CONT                 ;MONEY ORDER TOTAL
        MOV     SI,OFFSET CFEE-4
        MOV     DI,OFFSET CTOT
KTOTL2: ADD     SI,4                    ;FEE ADDRESS
        PUSH    SI
        PUSH    DI
        CALL    DPADD                   ;ADD UP ALL FEES
        LOOP    KTOTL2
KTOTL3: MOV     CX,CCNT                 ;SUM TOTAL TRANSACTIONS
        AD      CTCNT,CX
        MOV     SI,OFFSET CAMT-4
        MOV     DI,OFFSET CTOT
KTOTL4: ADD     SI,4
        PUSH    SI
        PUSH    DI
        CALL    DPADD
        LOOP    KTOTL4
        PUSH    DI
        MOV     SI,OFFSET CTAMT
```

```
                PUSH    SI
                CALL    DPADD                   ;SUM MACHINE TOTAL
                MOV     SI,OFFSET MOTMSG        ;MO TOT
                CMP     MOVP,1
                JE      KTOTL5
                MOV     SI,OFFSET VPTMSG        ;VP TOT
KTOTL5:         MOV     DI,OFFSET DBFR
                PUSH    DI                      ;DBER ADDRESS FOR DISPLAY
                MOV     CX,7
REP             MOVS    ES:BYTE PTR[DI],CS:[SI]
                MOV     SI,OFFSET CTOT          ;CONVERT TO ASCII & DISPLAY
                MOV     CX,OFFSET SCRTCH
                MOV     AH,9
                MOV     AL,KREAL
                PUSH    SI
                PUSH    DI
                PUSH    CX
                PUSH    AX
                CALL    BNASC                   ;CONVERT TO ASCII
                MOV     AX,SDBFR
                PUSH    AX
                MOV     AX,120H                 ;BLINKING DISPLAY, NO CURSOR
                PUSH    AX
                CALL    DISP                    ;DISPLAY
                RET
KTOTL6:         NOP                             ;TOTAL DISPLAY/REPORTS-$$$NO PROGRAM$$$
                RET
KSHFT:          MOV     SHFT,1                  ;DAY/SHIFT KEY
                RET

RO Assembler 03-06-84           Page 1-15

KEYBOARD MONITOR PROCEDURE

KDISP:          MOV     DSPR,1                  ;DISPLAY KEY - DSPR=1
                RET
KPRNT:          MOV     DSPR,2                  ;PRINT KEY - DSPR=2
                MOV     AL,MOVP
                CMP     AL,0
                JNZ     KPRNT1                  ;MO/VP PRINT
                RET
KPRNT1:         MOV     AL,CKPRS                ;$$$ SECURITY CHECK $$$
                XOR     AL,AL
                JZ      KPRNT2                  ;OK TO PRINT MONEY
                                                 ORDERS/VENDOR PAYMENTS
                RET                             ;PRINTER DISABLED - IGNORE
                                                 PRINT COMMAND
KPRNT2:         NOP                             ;PRINT CHECK - $$$ NO PROGRAM
                                                 $$$
KEYB            ENDP
                SUBTTL          KEYBOARD INITIALIZATION PROCEDURE

PAGE 66,132
NAME                    RMOD_PRINT

;###############################################################
;   ###  PRINTER DRIVER FOR RMOD. THIS PROGRAM ACCEPTS STRING  ###
;   ###  DATA AND TRANSFORMS IT INTO A LIST OF "CELL SPECS"    ###
;   ###  WHICH ARE SORTED AND PROCESSED TO GENERATE A LINE AT A ###
;   ###  TIME OF PIXEL DATA TO DRIVE THE FOUR PRINT SOLENOIDS  ###
;   ###  OF A _____ DOT MATRIX PRINTER                        ###
;   ###  THE ALGORITHM IS EXPLAINED IN A SEPARATE DOCUMENT      ###
;   ###  TITLED "_____".                                      ###
;###############################################################

STACK           SEGMENT         PARA    STACK   'STACK'

STACK_BOTTOM    LABEL           WORD
                ORG             OFFSET $+01FEH
STACK_TOP       LABEL           WORD
```

```
STACK           ENDS

DATA            SEGMENT     PARA    MEMORY  'DATA'

NEXT_CELL       LABEL       WORD
                ORG         OFFSET $+2
TOTAL_CELLS     LABEL       WORD
                ORG         OFFSET $+2
XCOORD          LABEL       WORD
                ORG         OFFSET $+2
YCOORD          LABEL       WORD
                ORG         OFFSET $+2
FONT            LABEL       BYTE
                ORG         OFFSET $+1
DIRECT          LABEL       BYTE
                ORG         OFFSET $+1
WDTH            LABEL       BYTE
                ORG         OFFSET $+1
HEIGHT          LABEL       BYTE
                ORG         OFFSET $+1
HSPACE          LABEL       BYTE
                ORG         OFFSET $+1
VSPACE          LABEL       BYTE
                ORG         OFFSET $+1
IPT_OFFS        LABEL       WORD
                ORG         OFFSET $+2
HORIZ           LABEL       WORD
                ORG         OFFSET $+2
VERT            LABEL       WORD
                ORG         OFFSET $+2
CSPECS_START    LABEL       WORD
                ORG         OFFSET $+2
ACTIVE_CELL_TABLE LABEL     WORD
                ORG         OFFSET $+(2*3*65)
ACTIVE_LIST     LABEL       WORD
                ORG         OFFSET $+2
THIS_ENT        LABEL       WORD
                ORG         OFFSET $+2
NEXT_ENT        LABEL       WORD
                ORG         OFFSET $+2
FREE_LIST       LABEL       WORD
                ORG         OFFSET $+2
BACK            LABEL       WORD
                ORG         OFFSET $+2
FWD             LABEL       WORD
                ORG         OFFSET $+2
NUMBER_ACTIVE   LABEL       BYTE
                ORG         OFFSET $+1
SWAPPED         LABEL       BYTE
                ORG         OFFSET $+1

;       THIS IS THE OUTPUT LINE BUFFER FOR SOLENOID DATA

BUFF            LABEL       BYTE        ; ROOM FOR 16 BYTES
                ORG         OFFSET $+16 ; LAST 2 FOR OVERFLOW
BIT             LABEL       BYTE        ; HOLDS POSITION IN SCANLINE
                ORG         OFFSET $+1
SCANLINE        LABEL       WORD        ; HOLDS CURRENT SCANLINE
                ORG         OFFSET $+2
PR_SHADOW       LABEL       BYTE
                ORG         OFFSET $+1
SOL             LABEL       BYTE        ; HOLDS VAL OF CURRENT
                ORG         OFFSET $+1  ; SOLENOID
```

```
INSERTED         LABEL        WORD            ; NUMBER OF CSPECS WHICH
                 ORG          OFFSET $+2      ; HAVE BEEN MADE ACTIVE
NXT2CHK          LABEL        WORD            ; OFFSET OF NXT CSPEC
                 ORG          OFFSET $+2      ; TO EXAMINE

;       FOR SIMULATION PURPOSES THIS VARIABLE WILL REPRESENT
;       THE IO PORT WHICH CONTROLS THE PRINTER THIS WILL HAVE
;       TO BE CHANGED TO AN I/O INSTRUCTION WHICH WRITES TO AN
;       IO SEGMENT ADDRESS

PRINT_PORT       LABEL        BYTE
                 ORG          OFFSET $+1

;       TEST DATA- TO BE REMOVED AFTER DEBUGGING IS DONE
;       THIS SPECIFIES 3 STRINGS TO BE PRINTED

STRING_LIST      DB           3               ;3 STRING DESCRIPTORS
                 DW           OFFSET STRING1
                 DW           OFFSET STRING2
                 DW           OFFSET STRING3

STRING1          DW           0               ;X COORDINATE
                 DW           0               ;Y COORDINATE
                 DB           AFONT           ;STANDARD FONT
                 DB           DOWN            ;CHECK ORIENTATION
                 DB           3               ;CHARACTER COUNT
                 DB           'ABC'           ;THE STRING

STRING2          DW           0               ;X COORDINATE
                 DW           0               ;Y COORDINATE
                 DB           AFONT           ;STANDARD FONT
                 DB           RIGHT           ;RECEIPT ORIENTATION
                 DB           4               ;NUMBER OF CHARS
                 DB           'TX_J'          ;THE STRING

STRING3          DW           25              ;XCOORDINATE
                 DW           10              ;Y COORDINATE
                 DB           AFONT           ;STANDARD FONT
                 DB           LEFT            ;BACKWARDS DIRECTION
                 DB           2               ;CHAR COUNT
                 DB           'HI'            ;THIRD STRING

FREE_SPACE       LABEL        WORD            ;SHOULD BE ENOUGH SPACE
                 ORG          $+(50*8)        ;FOR 50 CELL SPECS
END_DATA         LABEL        WORD
DATA             ENDS

;****************************************************************
;EQUATES
;****************************************************************

MAX_ACTIVE_CELLS      EQU     64
SIZE_OF_ACT           EQU     65
CSPEC_SIZE_IN_BYTES   EQU     8

RIGHT                 EQU     0
LEFT                  EQU     1
UP                    EQU     2
DOWN                  EQU     3

;OFFSETS WITHIN AN ACTIVE CELL TABLE ENTRY.
```

```
ACT_CSPEC_INDEX     EQU     0
ACT_BACK_PTR        EQU     2
ACT_FWD_PTR         EQU     4

;OFFSETS WITHIN A CELL SPEC

CSPEC_SCANLINE      EQU     0
CSPEC_FMEMOFFS      EQU     2
CSPEC_WIDTH         EQU     4
CSPEC_HEIGHT        EQU     5
CSPEC_XBYTEOFFS     EQU     6
CSPEC_XBITOFFS      EQU     7

;OFFSETS WITHIN A FONT DESCRIPTOR

FDESC_WIDTH         EQU     0
FDESC_HEIGHT        EQU     1
FDESC_HSPACE        EQU     2
FDESC_VSPACE        EQU     3
FDESC_IPTOFFS       EQU     4

;OFFSETS WITHIN A STRING DESCRIPTOR

STDESC_XCOORD       EQU     0
STDESC_YCOORD       EQU     2
STDESC_FONT         EQU     4
STDESC_DIRECT       EQU     5
STDESC_COUNT        EQU     6
STDESC_CHARS        EQU     7

MAX_SCANS           EQU     700     ;NUM SCANLINES PER MONEY ORDR
BITS_PER_SCAN       EQU     240     ;WIDTH OF ONE SCANLINE IN DOTS

;EQUATES USED WITH PRINT SHADOW REGISTER      PR_SHADOW

SOL1                EQU     01H
SOL2                EQU     02H
SOL3                EQU     04H
SOL4                EQU     08H
NOT_SOLENOIDS       EQU     0F0H
MTRDRV              EQU     010H
NOT_MTRDRV          EQU     0EFH
MTRSTP              EQU     020H
NOT_MTRSTP          EQU     0DFH
CLAMP_ON            EQU     080H
CLAMP_OFF           EQU     07FH

AFONT               EQU     0
BFONT               EQU     1

CODE                SEGMENT     WORD    PUBLIC  'CODE'

ASSUME      CS:CODE
            ASSUME      DS:DATA
            ASSUME      SS:STACK

;**************************************************************
; DRIVER ROUTINE :   THIS IS FOR DEBUGGING-SHOULD COME OUT LATER
;**************************************************************

TEST_STARTS:        MOV     AX,DATA
                    MOV     DS,AX
```

```
                MOV     AX,STACK        ;SET UP STACK SEG
                MOV     SS,AX
                MOV     SP,OFFSET STACK_TOP ;SET UP STK PTR

MOV     DX,OFFSET FREE_SPACE
                MOV     BX,OFFSET STRING_LIST
                CALL    PRNTR
TEST_DONE:      JMP     TEST_DONE
```

;*************************************************************
;END OF DEBUGGING CODE
;*************************************************************

;*************************************************************
;
;   THIS IS THE MAIN ENTRY POINT FOR THE WHOLE PRINTER DRIVER
;   PRNTR EXPECTS TWO PARAMETERS:
;
;       1. THE OFFSET OF THE STRING LIST TABLE SHOULD BE IN BX reg
;
;       2. THE OFFSET OF UNRESTRICTED WORKSPACE ABOVE ALL STRINGS
;          AND OTHER DATA SHOULD BE IN DX reg
;
;*************************************************************

```
PRNTR:      ;   PUSHA   ***** 80186 INST. ;SAVE ALL REGISTERS
                                         ; REPLACED BY THE FOLLOWING
                PUSH    AX
                PUSH    BX
                PUSH    CX
                PUSH    DX
                PUSH    DS
                PUSH    ES
                PUSH    SS
                PUSH    DI
                PUSH    SI
                PUSH    BP

MOV     AX,DATA         ;SET UP SEGMENT REGISTER
                MOV     DS,AX
```

;   GET THE OFFSET OF UNRESTRICTED WORKSPACE IN WHICH WE MAY
;   BUILD THE TABLES. CALLER SHOULD SUPPLY THIS IN DX REGISTER

```
                MOV     NEXT_CELL,DX    ;OFFSET OF FREE AREA IN DATA SEGMENT
                                        ; FOR TABLES
                MOV     TOTAL_CELLS,0   ;COUNTER FOR CELL SPECS
                MOV     CSPECS_START,DX ;SAVE ORIGIN OF CELL SPEC TABLE.

SUB     CX,CX
```

;   BX HOLDS OFFSET IN DATA SEGMENT OF STRING LIST

```
                MOV     CL,[BX]         ;GET NUMBER OF STRINGS TO PROCESS
                INC     BX              ;BX HOLDS OFFSET OF WORD HOLDING
                                        ;OFFSET OF FIRST STRING IN LIST
```
;   CHECK FOR ZERO STRINGS
```
                CMP     CL,0
                JG      DO_A_STRING
```

```
                    JMP         LISTS_DONE

;************************************************************
; PROCESS EACH STRING IN THE STRING LIST. BX HOLDS THE OFFSET OF THE FIRST
; ENTRY IN THE STRING LIST TABLE. CL HOLDS THE NUMBER OF STRINGS TO PROCESS
; CSPECS_START HOLDS THE OFFSET OF THE AREA WHERE THE CELL SPECS WILL BE
; BUILT AND SORTED.
;************************************************************

DO_A_STRING:        MOV         DX,[BX]             ;DX HOLDS OFFSET OF NEXT STRING DESC
                    INC         BX                  ;MAKE BX POINT TO WORD HOLDING
                    INC         BX                  ;OFFSET OF NEXT STRING DESC AND
                    PUSH        BX                  ;SAVE ON STACK FOR NEXT LOOP

;       NOW LOAD PARAMETERS FOR CURRENT STRING

MOV         BX,DX               ;OFFSET OF CURRENT STRING DESC
                    MOV         AX,[BX+STDESC_XCOORD]
                    MOV         XCOORD,AX

MOV         AX,[BX+STDESC_YCOORD]
                    MOV         YCOORD,AX

MOV         AL,[BX+STDESC_FONT]
                    MOV         FONT,AL

MOV         AL,[BX+STDESC_DIRECT]
                    MOV         DIRECT,AL

PUSH        BX                  ;SAVE WHILE DOING NEXT

SUB         BX,BX               ;MULTIPLY FONT BY 6
                    MOV         BL,FONT             ;TO MAKE IT AN INDEX
                    SHL         BX,1                ;INTO THE FONT_SPEC_TABLE
                    MOV         DX,BX
                    SHL         BX,1
                    ADD         BX,DX

;NOW GET THE PARAMETERS FOR THE FONT REQUESTED

ADD         BX,OFFSET FONT_SPEC_TABLE

MOV         AL,CS:[BX+FDESC_WIDTH]
                    MOV         WDTH,AL    ; WIDTH IN BYTES

MOV         AL,CS:[BX+FDESC_HEIGHT]
                    MOV         HEIGHT,AL  ; HEIGHT IN BITS

MOV         AL,CS:[BX+FDESC_HSPACE]
                    MOV         HSPACE,AL

MOV         AL,CS:[BX+FDESC_VSPACE]
                    MOV         VSPACE,AL

MOV         AX,CS:[BX+FDESC_IPTOFFS]
                    MOV         IPT_OFFS,AX

;NOW INITIALIZE CUMULATIVE POSITIONERS

MOV         HORIZ,0
                    MOV         VERT,0
```

```
                    POP         BX ; RESTORE OFFSET OF CURRENT STRING DESCRIPTOR
                    PUSH        CX ; SAVE STRING COUNTER

;SET UP REGISTERS TO LOOP THROUGH CHARACTERS OF CURRENT STRING

MOV         SI,NEXT_CELL
                    ADD         BX,STDESC_COUNT  ;BX IS OFFSET OF CHARACTER COUNT
                    SUB         CH,CH
                    MOV         CL,[BX]          ;LOOP COUNT = NUMBER OF CHARS

DO_A_CHAR:      INC         BX               ;POINT TO CURRENT CHAR
                    SUB         AX,AX
                    MOV         AL,[BX]          ;GET THE CHAR
                    PUSH        BX               ;SAVE PTR FOR NEXT LOOP
                    SHL         AX,1
                    ADD         AX,IPT_OFFS      ;POINT TO IPT ENTRY FOR CHAR
                    MOV         BX,AX
                    MOV         AX,CS:[BX]       ;GET FONT MEM OFFSET FOR CHAR

;NOW BUILD THE CELL SPEC POINTED TO BY SI REG

MOV         [SI+CSPEC_FMEMOFFS],AX  ;FMEM OFFSET

MOV         AX,YCOORD
                    ADD         AX,VERT
                    MOV         [SI+CSPEC_SCANLINE],AX  ;CHAR ORIGIN SCANLINE

MOV         AX,XCOORD
                    ADD         AX,HORIZ
                    MOV         DX,AX
                    AND         AX,0007H
                    MOV         [SI+CSPEC_XBITOFFS],AL  ;CHAR ORIGIN BIT REMAINDER

SHR         DX,1
                    SHR         DX,1
                    SHR         DX,1
                    MOV         [SI+CSPEC_XBYTEOFFS],DL ;CHAR ORIGIN MOD BYTE

MOV         AL,WIDTH
                    MOV         [SI+CSPEC_WIDTH],AL     ;CHAR WIDTH IN BYTES

MOV         AL,HEIGHT
                    MOV         [SI+CSPEC_HEIGHT],AL    ;CHAR HEIGHT IN BITS

;************************************************************
    ; NOW CHECK DIRECTION TO COMPUTE CUMULATIVE POSITIONERS FOR NEXT
    ; CHARACTER THE DRAWING SHOWS THE PRINT ORIENTATIONS
    ;************************************************************

;************************************************************
```

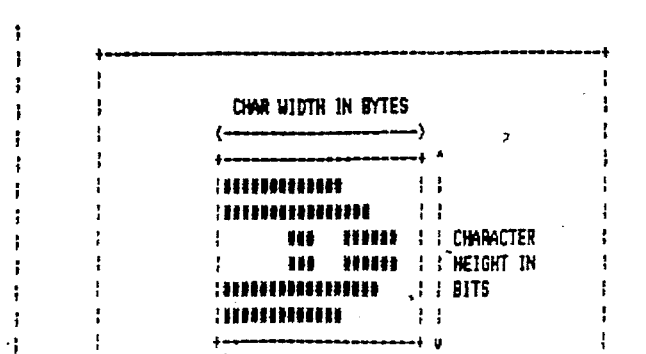

```
;                 (-----------------------)     ^
;                    HORIZONTAL    X-AXIS        :
;
;                         UP              VERTICAL :
;                          :               Y-AXIS  :
;                          :                       :
;                  LEFT ---+--- RIGHT              v
;                          :
;                         DOWN
;
; +-----------------------------------------------------+
; :                                                     :
; :                       PRINTER                       :
; :                                                     :
; +-----------------------------------------------------+
;
;
;   NORMAL ORIENTATION FOR CHECK PRINTING IS "DOWN"
;
;   NORMAL ORIENTATION FOR RECEIPTS WOULD BE "RIGHT"
;
;
;                     #####...    ^  ^
; .FONT0:             ..#..#..    :  :
;                     ..#...#..   5  :
; Letter "A"          ..#..#..    :  7    CHAR WIDTH IN BYTES   = 1
;                     #####...    v  :    CHAR HEIGHT IN BITS   = 5
;                                    :    HORIZ SPACING IN BITS = 10
;                                    ^    VERT SPACING IN BITS  = 7
;                     (------)
;                      1 BYTE
;
;                     (-- 10 --)
;
;***********************************************************************

TRY_RIGHT:     CMP      DIRECT,RIGHT   ;NORMAL, SO TRY THIS FIRST TO SAVE TIME
               JNE      TRY_UP         ;NOT RIGHT- GO ON
DO_RIGHT:      MOV      AL,HSPACE      ;NORMAL ORIENTATION ON A RECEIPT
               ADD      HORIZ,AX       ;NEXT CHAR IN THIS STRING WILL BE PLACED
               JMP      CSPEC_DONE     ;THIS CHARACTER'S HORIZONTAL SPACING
                                       ;TO THE RIGHT OF THIS CAHRACTER

TRY_UP:        CMP      DIRECT,UP
               JNE      TRY_LEFT
DO_UP:         MOV      AL,VSPACE      ;NEXT CHAR WILL BE PLACED THIS
               SUB      VERT,AX        ;CHARS VERTICAL SPACING ABOVE
               JMP      CSPEC_DONE     ;THIS CHARACTER

TRY_LEFT:      CMP      DIRECT,LEFT    ;UPSIDE DOWN & BACKWARDS PRINTING
               JNE      DO_DOWN
DO_LEFT:       MOV      AL,HSPACE      ;NEXT CHAR WILL BE PLACED THIS
               SUB      HORIZ,AX       ;CHAR'S HORIXONTAL SPACING TO THE
               JMP      CSPEC_DONE     ;LEFT OF THIS CHARACTER

DO_DOWN:       MOV      AL,VSPACE      ;NEXT CHAR WILL BE PLACED THIS
               ADD      VERT,AX        ; CHAR'S VERTICAL SPACING BELOW
                                       ;THIS CHARACTER. NORMAL
                                       ; ORIENTATION FOR CHECK

CSPEC_DONE:    ADD      SI,CSPEC_SIZE_IN_BYTES
               INC      TOTAL_CELLS
               POP      BX             ;RESTORE OFFSET OF
```

```
                    DEC         CX              ;THIS CHAR IN
                    JZ          STRING_DONE     ;STRING DESCRIPTOR
                    JMP         DO_A_CHAR

STRING_DONE:        POP         CX              ;RESTORE STRING LOOP CTR
                    POP         BX              ;RESTORE OFFSET OF
                    MOV         NEXT_CELL,SI    ;SAVE THE OFFSET
                    DEC         CX              ;NEXT SLOT IN STRING
                    JZ          SORT_CSPECS     ;TABLE
                    JMP         DO_A_STRING

;************************************************************
; IN-PLACE BUBBLE SORT OF CSPEC LIST INTO ASCENDING ORDER BASED ON
; CONTENTS OF 1ST WORD IN EACH CELL SPEC
;************************************************************

SORT_CSPECS:        MOV         CX,TOTAL_CELLS
                    DEC         CX              ;OUTER LOOP IS DONE n - 1 TIMES
I_LOOP:             PUSH        CX              ;SAVE OUTER LOOP COUNTER

MOV         BX,CSPECS_START ;BEGINNING OF TABLE TO SORT
                    MOV         SWAPPED,0       ;SET FLAG CLEAR FOR NEXT INNER LOOP
                    MOV         CX,TOTAL_CELLS  ;INNER LOOP IS DONE n - 2
                    SUB         CX,2            ;TIMES
J_LOOP:             PUSH        CX              ;SAVE INNER LOOP COUNTER
                    MOV         AX,[BX]         ;COMPARE ACT_CSPEC_INDICES FOR
                    CMP         AX,[BX+8]       ;TWO ADJACENT CELLS. IF OUT OF
                    JNG         NO_SWAP         ;ORDER, THEN SWAP THEIR CONTENTS
SWAP:               PUSH        CX              ;SAVE INNER LOOP COUNTER
                    MOV         CX,CSPEC_SIZE_IN_BYTES/2 ;LOOP HERE ONCE FOR EACH
                                                ;WORD IN A CELL SPEC
SWAP_LOOP:          MOV         AX,[BX]         ;GET THE WORDS TO SWAP
                    MOV         DX,[BX+8]
                    MOV         [BX],DX         ;PUT THEM BACK IN SWAPPED
                    MOV         [BX+8],AX       ;POSITIONS
                    ADD         BX,2
                    LOOP        SWAP_LOOP

POP         CX

MOV         SWAPPED,1       ;SET FLAG SAYING AT LEAST ONE SWAP
                                                ;IN THRU INNER LOOP
                    JMP         NEXT_J

NO_SWAP:            ADD         BX,8            ;ADJUST POINTER UP ONE CELLSPEC

NEXT_J:             POP         CX              ;RESTORE INNER LOOP COUNTER

LOOP        J_LOOP

CMP         SWAPPED,0       ;IF FLAG WAS SET, SWAPS WERE MADE
                    JNE         NOT_DONE        ;AND WE ARE NOT DONE
                    POP         CX              ;BUT IF FLAG WAS NOT SET,
                                                ;RESTORE STACK
                    JMP         LISTS_DONE      ;AND GET OUT OF SORT ROUTINE

NOT_DONE:           POP         CX              ;RESTORE OUTER LOOP COUNTER
                    LOOP        I_LOOP

;************************************************************
; CELL SPEC LIST IS SORTED AND READY TO PROCESS SEQUENTIALLY
```

```
; NOW FIRE UP THE PRINTER, BUILD SCANLINES, AND PRINT IT ALL
;*****************************************************************

LISTS_DONE:     CALL    REL_CLAMP       ; RELEASE PAPER CLAMP
                CALL    ACT_INIT        ; INITIALIZE ACTIVE LIST
                MOV     SCANLINE,0
                MOV     SOL, 01H        ; READY FIRST SOLENOID
                MOV     INSERTED, 0
                MOV     AX, CSPECS_START
                MOV     NXT2CHK,AX
                CALL    SOLENOIDS_OFF   ; RELEASE ANY SOLENOIDS THAT
                                        ; MIGHT INADVERTENTLY BE ON
                CALL    MOTOR_ON        ; START MOVING PAPER

;*****************************************************************
; THIS IS THE TOP OF THE LOOP WHICH IS TRAVERSED ONCE PER SCANLINE
; FIRST WE WAIT TILL CARRIAGE RETURN DETECTED, THEN BUILD A SCANLINE
; AND DUMP IT EVERY TIME THEREAFTER THAT A PRINT CLOCK SIGNAL IS
; DETECTED.
;*****************************************************************

WAIT4RST:       CALL    PRTST
                AND     AL,AL
                JZ      WAIT4RST

;*****************************************************************
; CHECK NOW TO DETERMINE WHETHER ALL SCANLINES HAVE BEEN MADE
; AND, IF SO, QUIT AND TURN OFF THE MOTOR BEFORE RETURNING
;*****************************************************************

WEHAVERST:      CMP     SCANLINE, MAX_SCANS
                JE      CHECK_PRINTED

CALL    BUILD_NXT_SCAN
                MOV     BIT,0;

;*****************************************************************
; WAIT TILL PRINT CLOCK HAS BEEN ASSERTED
;*****************************************************************

WAIT4CLK:       CALL    PRTST
                AND     AH,AH
                JZ      WAIT4CLK

;       CHECK WHETHER ALL BITS IN THE SCANLINE HAVE BEEN ACCOUNTED FOR

WEHAVECLK:      CMP     BIT,BITS_PER_SCAN
                JNE     DO_DE_BIT
                INC     SCANLINE
                JMP     WAIT4RST

; TURN OFF THE LAST SOLENOID BY TURNING OFF ALL OF THEM
; THEN FIND THE STATE OF THE CURRENT BIT AND, IF TRUE,
; FIRE PROPER SOLENOID

DO_DE_BIT:      AND     PR_SHADOW, 0F0H ; OFF ALL SOLENOIDS

CALL    ISOLATE_BIT     ; TEST BIT "BIT"
                AND     AL,AL           ; TEST VALUE PUT HERE
                                        ; BY ISOLATE_BIT
                JZ      DONT_FIRE

; WE WILL FIRE THE NEXT SOLENOID THIS TIME
```

```
FIRE_ONE:           MOV         DL,SOL
                    OR          PR_SHADOW,DL

;       WE MAY OR MAY NOT HAVE ORED A SOLENOID BIT INTO THE SHADOW AT THIS POINT

DONT_FIRE:          INC         BIT             ; POINT TO NEXT BIT
                    CMP         SOL,SOL4        ; IF TRUE RESET TO SOL1
                    JE          SOL_IS_8
SOL_NOT_8:          SHL         SOL,1           ; OTHERWISE SET NXT SOL
                    JMP         WRITE_SHADOW
SOL_IS_8:           MOV         SOL,SOL1                        ; RESETS SOL TO SOL1
        ; WRITE THE VALUE IN THE SHADOW REGISTER TO THE OUTPUT PORT

WRITE_SHADOW:       MOV         AL, PR_SHADOW
                    MOV         PRINT_PORT,AL

; NOW WAIT FOR THE NEXT PRINT CLOCK

JMP         WAIT4CLK

; THE LAST SCANLINE SHOULD HAVE BEEN PRINTED.
        ; NOW TURN OFF THE MOTOR AND ALL SOLENOIDS AND RETURN

CHECK_PRINTED:      CALL        MOTOR_OFF;
                    CALL        SOLENOIDS_OFF

; NOW ALL DONE PRINTING, RETURN TO THE ROUTINE THAT CALLED PRNTR

;       POPA        **** 80186 INST.        ; RESTORE ALL REGISTERS REPLACED BY
                                            ; THE FOLLOWING

POP         BP
                    POP         SI
                    POP         DI
                    POP         SS
                    POP         ES
                    POP         DS
                    POP         DX
                    POP         CX
                    POP         BX
                    POP         AX

RET

;ROUTINES FOR MANAGING THE ACTIVE CELL LIST

;INITIALIZING THE ACTIVE CELL LIST

ACT_INIT:           MOV         BX,OFFSET ACTIVE_CELL_TABLE
                    MOV         CX,SIZE_OF_ACT
                    MOV         AX,01H
INIT_ACT:           MOV         [BX+ACT_FWD_PTR],AX  ;LINK EACH ENTRY BY
                    INC         AX                   ;MAKING EACH FORWARD
                    ADD         BX,6                 ;POINTER POINT TO THE
                    LOOP        INIT_ACT             ;NEXT ENTRY IN THE LIST
```

```
                MOV         FREE_LIST,0         ;FREE LIST STARTS WITH 0th ENTRY
                MOV         NUMBER_ACTIVE,0     ;ACTIVE LIST IS NULL
                MOV         ACTIVE_LIST,0FFFFH
                RET                             ;ALL DONE

;INSERTING A CELL SPEC INTO THE ACTIVE CELL LIST
;AX HOLDS INDEX INTO SORTED LIST OF CELL SPECS
;ALGORITHM IS:
;       OLD_ACTIVE = ACTIVE_LIST
;       ACTIVE_LIST = FREE_LIST
;       FREE_LIST = FREE_LIST(4)
;
;       ACTIVE_ENTRY(CSPINDX) = CELL SPEC INDEX
;       ACTIVE_ENTRY(BKPTR) = NULL   (THIS IS BACK PTR OF 1ST IN NEW ACT LIST)
;       ACTIVE_ENTRY(FWDPTR) = OLD_ACTIVE
;       IF OLD_ACTIVE NOT NULL THEN
;               OLD_ACTIVE ENTRY(BKPTR) = ACTIVE_LIST

INSERT_INTO_ACT:
                CMP         NUMBER_ACTIVE,MAX_ACTIVE_CELLS
                JAE         TOO_MANY_INSERTS
;       MAKE OLD_ACT = ACTIVE_LIST  CX USED TO HOLD OLD_ACTIVE
                MOV         DX,ACTIVE_LIST
                MOV         CX, DX

;       ACTIVE_LIST = FREE_LIST
                MOV         SI, FREE_LIST
                MOV         ACTIVE_LIST,SI

;       FREE_LIST = FORMER 2ND ENTRY IN FREE LIST. MULTIPLY INDEX BY 6
                SHL         SI,1
                MOV         DI,SI
                SHL         SI,1
                ADD         SI,DI
                MOV         BX, OFFSET ACTIVE_CELL_TABLE
                MOV         DI, [BX+SI+ACT_FWD_PTR]
                MOV         FREE_LIST, DI

;       SI STILL POINTS TO OFFSET OF NEW ACTIVE ENTRY
;       FIX UP THREE ENTRIES IN NEWLY ACTIVE CELL
                MOV         [BX+SI+ACT_CSPEC_INDEX], AX  ; INDEX OF CSPEC BEING ADDED
                MOV         WORD PTR [BX+SI+ACT_BACK_PTR],0FFFFH
                MOV         AX, CX
                MOV         [BX+SI+ACT_FWD_PTR],AX
                CMP         AX,0FFFFH
                JE          BUMP_ACTIVES

;       OLD_ACTIVE WAS NOT NULL, SO LINK ITS BACK PTR TO THE NEW HEAD OF ACTIVES
;       AX HOLDS OLD_ACTIVE. MULTIPLY IT BY 6
                SHL         AX,1
                MOV         SI,AX
                SHL         SI,1
                ADD         SI,AX
                MOV         AX,ACTIVE_LIST
                MOV         [BX+SI+ACT_BACK_PTR],AX
BUMP_ACTIVES:   INC         NUMBER_ACTIVE
TOO_MANY_INSERTS: RET

;ROUTINE TO REMOVE EXHAUSTED CELL SPEC FROM ACTIVE LIST
;AND RETURN ITS SLOT TO FREE LIST. AX HOLDS INDEX INTO ACTIVE CELL TABLE OF;
;ENTRY TO BE REMOVED
```

```
REMOVE_FROM_ACT:
                CMP     NUMBER_ACTIVE,0         ;IF NONE,WE HAVE
                                                ;A PROBLEM
                JG      OK_TO_REMOVE
                JMP     TOO_MANY_REMOVALS
OK_TO_REMOVE:   MOV     BX,OFFSET ACTIVE_CELL_TABLE ;HEAD OF TABLE
                MOV     SI,AX                   ;MULTIPLY INDEX BY 6
                SHL     SI,1                    ;TO MAKE IT A BYTE
                MOV     CX,SI                   ;INDEX INTO THE ACT
                SHL     SI,1
                ADD     SI,CX
                MOV     DX,[BX+SI+ACT_BACK_PTR] ;SAVE THIS
                MOV     BACK,DX

MOV     DX,[BX+SI+ACT_FWD_PTR]  ;AND THIS
                MOV     FWD,DX

MOV     DX,FREE_LIST            ;LINK THIS ENTRY INTO
                MOV     [BX+SI+ACT_FWD_PTR],DX

MOV     FREE_LIST,AX            ;FREE LIST AHEAD OF ALL OTHERS
                CMP     BACK,0FFFFH             ;WAS HEAD OF ACT HOLDING
                JNE     NOT_FIRST               ;THE FIRST ENTRY IN FREE LIST
FIRST:          MOV     AX,FWD                  ;YES, IT WAS
                MOV     ACTIVE_LIST,AX          ;ACTIVE NOW POINTS TO WHAT
                                                ;THIS ENTRY USED TO POINT TO
                MOV     SI,AX                   ;MAKE THIS INTO BYTE INDEX
                SHL     SI,1
                MOV     CX,SI
                SHL     SI,1
                ADD     SI,CX
                MOV     WORD PTR [BX+SI+ACT_BACK_PTR],0FFFFH
                                                ;MAKE SUCESSOR'S
                                                ;BACK PTR NULL
                                                ;BECAUSE IT IS NEW HEAD
                                                ;OF ACTIVE LIST
                DEC     NUMBER_ACTIVE           ;ALL DONE
                RET

NOT_FIRST:      CMP     FWD,0FFFFH              ;IS ENTRY TO BE REMOVED IN MIDDLE
                JNE     MIDDLE
LAST:           MOV     SI,BACK                 ;NO, IT IS LAST IN LIST
                SHL     SI,1
                MOV     CX,SI                   ;MAKE THE PREDECESSOR'S
                SHL     SI,1                    ;FORWARD
                ADD     SI,CX                   ;POINTER
                MOV     WORD PTR [BX+SI+ACT_FWD_PTR],0FFFFH
                                                ;NULL FWD PTR BECAUSE LAST
                DEC     NUMBER_ACTIVE
                RET                             ;ALL DONE

MIDDLE:         MOV     SI,FWD                  ;CELL TO BE REMOVED IS
                SHL     SI,1                    ;SOMEWHERE IN THE MIDDLE
                MOV     CX,SI
                SHL     SI,1                    ;MAKE PREDECESSOR'S
                ADD     SI,CX                   ;FWD POINTER
                MOV     AX,BACK                 ;POINT TO SUCESSOR
                MOV     [BX+SI+ACT_BACK_PTR],AX
                MOV     SI,AX                   ;AND MAKE
                SHL     SI,1                    ;SUCESSOR'S
                MOV     CX,SI                   ;BACK PTR
```

```
                        SHL     SI,1            ;POINT TO
                        ADD     SI,CX           ;PREDECESSOR
                        MOV     AX,FWD
                        MOV     [BX+SI+ACT_FWD_PTR],AX
                        DEC     NUMBER_ACTIVE
TOO_MANY_REMOVALS:      RET                     ;ALL DONE

;
; ROUTINE TO DETERMINE THE STATE OF A BIT IN THE SCANLINE BUFFER

ISOLATE_BIT:            SUB     BX,BX           ; CLEAR THIS REGISTER
                        MOV     BL,BIT          ; GET INDEX OF BIT IN
                                                ;  SCANLINE BUFFER
                        MOV     DL,BL           ; SAVE IT TEMPORARILY
                        MOV     CX,3            ; FOR DIVIDE BY 8 TO GET
                        SHR     BX,CL           ;  BYTE INDEX OF BUFF
                        AND     DL,7            ; FIND BIT REMAINDER
                        INC     DL              ; FOR BITS TO SHIFT OUT
                        ADD     BX,OFFSET BUFF  ; POINT TO BYTE IN MEM
                        MOV     AL,[BX]         ; READ BYTE OF BUFF
                        MOV     CL,DL           ; SHIFT COUNT
                        SHL     AL,CL           ; SHIFT DESIRED BIT OUT
                                                ; TO CARRY FLAG
                        JC      SET_BIT         ; IF CARRY THEN BIT = T
                        SUB     AX,AX           ; CLR AX IF BIT FALSE
                        RET
SET_BIT:                MOV     AX,1            ; SET AX IF BIT TRUE
                        RET

; ROUTINE TO TURN OFF ALL FOUR SOLENOIDS

SOLENOIDS_OFF:          AND     PR_SHADOW, NOT_SOLENOIDS
                        MOV     AL, PR_SHADOW
                        MOV     PRINT_PORT, AL
                        RET

; ROUTINE TO TURN MOTOR ON

MOTOR_ON:               OR      PR_SHADOW, MTRDRV
                        AND     PR_SHADOW, NOT_MTRSTP
                        MOV     AL, PR_SHADOW
                        MOV     PRINT_PORT,AL
                        RET

; ROUTINE TO TURN MOTOR OFF

MOTOR_OFF:              OR      PR_SHADOW, MTRSTP
                        AND     PR_SHADOW, NOT_MTRDRV
                        MOV     AL, PR_SHADOW
                        MOV     PRINT_PORT, AL
                        RET

; ROUTINE TO REMOVE ALL POWER FROM MOTOR

MTR_PWR_OFF:            AND     PR_SHADOW, NOT_MTRSTP
                        AND     PR_SHADOW, NOT_MTRDRV
```

```
                    MOV     AL, PR_SHADOW
                    MOV     PRINT_PORT, AL
                    RET

; ROUTINE TO FIRE A SOLENOID; WHATEVER VALUE IS IN SOL WHEN THIS ROUTINE
; IS CALLED WILL BE OUTPUT; ALL OTHER SOLENOIDS WILL BE TURNED OFF

FIRE_SOLENOID:      AND     PR_SHADOW, NOT_SOLENOIDS
                    MOV     AL, SOL
                    OR      PR_SHADOW, AL
                    MOV     PRINT_PORT, AL
                    RET

; ROUTINE TO SET THE STATE OF THE PAPER CLAMP TRUE, TO HOLD THE PAPER

SET_CLAMP:          OR      PR_SHADOW, CLAMP_ON
                    MOV     AL, PR_SHADOW
                    MOV     PRINT_PORT, AL
                    RET

; ROUTINE TO RELEASE THE PAPER CLAMP

REL_CLAMP:          AND     PR_SHADOW, CLAMP_OFF
                    MOV     AL, PR_SHADOW
                    MOV     PRINT_PORT, AL
                    RET

;*********************************************************************
;
; ROUTINE TO BUILD THE NEXT SCANLINE USING THE ACTIVE CELL TABLE, THE CURRENT
; SCANLINE, AND ALL THE VALUES IN THE ACTIVE CELL SPECS
;
;*********************************************************************

;       FIRST, CLEAR OUT THE OLD BUFFER SO ALL NEW DATA MAY BE ORED IN

BUILD_NXT_SCAN:
                    MOV     CX,08H   ; NUMBER OF WORDS TO CLEAR
                    SUB     AX,AX    ; CLEAR THIS TO ZERO
                    MOV     BX, OFFSET BUFF
CLR_BUFF:           MOV     [BX], AX;
                    INC     BX
                    INC     BX
                    LOOP    CLR_BUFF

;       NEXT FIND ANY NEW ACTIVE CELL SPECS TO INSERT INTO THE ACTIVE LIST
;       CHECK WHETHER ALL CSPECS HAVE BEEN MADE ACTIVE BY THIS TIME

CHECK4INSRT:        MOV     DX, INSERTED
                    CMP     DX, TOTAL_CELLS
                    JE      PROCESS_ACT

;       IF THEY HAVE NOT ALL BEEN PLACED INTO ACT THEN CHECK TO SEE IF ANY
;       WILL GO INTO ACT FOR THIS SCANLINE

MOV     BX, NXT2CHK    ; OFFS OF NXT CSPEC TO CHECK
                    MOV     AX,[BX]        ; AX NOW HAS SCANLINE
                    CMP     AX,SCANLINE    ; IS IT = CURRENT SCANLINE?
                    JNE     PROCESS_ACT    ; IF NOT, NO INSERTS
```

```
;       NOW INSERT CELLS INTO ACT WHILE THEIR SCANLINES ARE
;       EQUAL TO CURRENT SCANLINE

INSERT_CELL:        MOV     AX,BX           ; OFFS OF CSPEC TO INSERT
                    INC     INSERTED        ; INDEX OF CSPEC TO GO IN
                    CALL    INSERT_INTO_ACT
                    ADD     NXT2CHK, CSPEC_SIZE_IN_BYTES
                    JMP     CHECK4INSRT

;       NOW PROCESS ALL ACTIVE CELLS FIRST CECK WHETHER ANY ARE ACTIVE

PROCESS_ACT:        CMP     NUMBER_ACTIVE,0
                    JG      SOME_R_ACTV
                    RET                     ; BECAUSE NONE R ACTIVE

SOME_R_ACTV:        MOV     SI,ACTIVE_LIST  ; INDX OF ACT OF 1ST ENT
                    MOV     NEXT_ENT,SI     ; IS NEXT TO LOOK AT
NEXT_CSPEC:         MOV     SI,NEXT_ENT     ; NEXT IS CURRENT
                    MOV     THIS_ENT,SI     ; ONE TO LOOK AT
                    SHL     SI,1            ; MAKE THIS_ENT AN INDX
                    MOV     DI,SI
                    SHL     SI,1
                    ADD     SI,DI

;       SAVE INDEX IN ACT OF NEXT ENTRY TO CHECK, MAY BE FFFF IF NO MORE

MOV     BX,OFFSET ACTIVE_CELL_TABLE
                    MOV     DX,[BX+SI+ACT_FWD_PTR] ; LINK TO NXT ACTIVE CELL
                    MOV     NEXT_ENT,DX

;       NOW GET OFFSET OF CSPEC TO EXAMINE FIRST; BX STILL HAS OFFSET OF ACT

MOV     BX,[BX+SI]      ; CSPEC OFFSET IN SORTED TABLE

;       PROCESS ONE CELL SPEC

MOV     DI,[BX+CSPEC_XBYTEOFFS]
                    AND     DI, 00FFH       ; WE ONLY WANT BYTE IN LOW
                                            ; HALF OF DI REG
                    MOV     SI,[BX+CSPEC_FMEMOFFS]
                    SUB     CX,CX
                    MOV     CL,[BX+CSPEC_WIDTH]
                    SUB     DX,DX           ; CLEAR SAVE REGISTER
ONE_CELL:           SUB     AX,AX           ; CLEAR WORK REGISTER
                    MOV     AH, CS:[SI]     ; READ A BYTE OF FONT MEM
                                            ; FROM CODE SEGMENT
                    PUSH    CX
                    MOV     CL,[BX+CSPEC_XBITOFFS]
                    SHR     AX,CL           ; ALIGN WITH SCANLINE
                                            ; BIT OFFSET
                    POP     CX              ; RESTORE WIDTH LOOP CTR
                    OR      AH,DH           ; OR IN SAVED BITS FROM
                                            ; PREVIOUS BYTE
                    MOV     BP, OFFSET BUFF
                    OR      DS:[BP+DI],AH   ; OR DATA INTO SCANLINE
                    MOV     DH,AL           ; SAVE BITS SHIFTED OUT
                    INC     DI              ; INC SCANLINE BYTE INDEX
                    INC     SI              ; INC FONT MEM INDEX
                    LOOP    ONE_CELL
;       NOW IF DH NOT ZERO THEN THERE WAS DATA SHIFTED OUT OF AX WHICH MUST
;       ALSO BE ORED INTO THE SCANLINE. THE BYTE OFFSET IN DI HAS BEEN INCREMENTED
;       SO JUST OR IN DH RATHER THAN AH
```

```
                    OR          DS:[BP+DI],DH

MOV         [BX+CSPEC_FMEMOFFS],SI
                                            ; UPDATE FONT MEM OFFSET
                    DEC         BYTE PTR [BX+CSPEC_HEIGHT]
                    JNZ         GETNXTCSPC
                    MOV         AX,THIS_ENT
                    CALL        REMOVE_FROM_ACT
GETNXTCSPC:         CMP         NEXT_ENT, OFFFFH
                    JNE         NEXT_CSPEC

NO_MORE_ACTV:       RET                     ; ALL ACTIVE CELLS PROCESSED
```

Although the preferred embodiment of the invention describes a method and apparatus for dispensing money orders, it should be appreciated that the present invention may be utilized to dispense any type of negotiable instrument.

Although the invention has been described in detail, it is to be clearly understood that the same is by way of illustration and example only and is not to be taken by way of limitation, the spirit and scope of the invention being limited only to the terms of the appended claims.

I claim:

1. An automatic money order dispenser for printing and dispensing money orders of the type having relatively long top and bottom edges and relatively short left and right side edges, and having alphanumeric indicia pre-printed thereon along lines extending substantially parallel to the top and bottom edges comprising:

a money order issuing path along which the pre-printed money order forms travel with one of the side edges of each form positioned as a leading edge as the forms travel along the issuing path through the dispenser;

printing means extending entirely transversely across the money order issuing path and perpendicular to the top and bottom edges of the money order forms for simultaneously printing variable alphanumeric indicia on blank forms on a plurality of lines extending substantially parallel to the top and bottom edges of the forms thereby forming completed money order to be issued;

means for insuring blank forms are not counterfeit including means sensing at least one code mark on each blank form said means for insuring also including means determining whether the blank forms are properly located in the printing means before actuating the printing means;

external housing enclosing the money order issuing path and printing means and having parallel first and second side walls, parallel third and fourth side walls extending perpendicularly to and interconnecting the first and second side walls, and a top wall interconnecting upper edges of the first and second side walls and the third and fourth side walls;

a compartment within the housing for storing blank money order forms for feeding into the money order issuing path with the top and bottom edges of the stored blank forms extending substantially parallel to the money order issuing path and the first and second side walls of the housing; and a slot in the third wall extending substantially perpendicular to the money order issuing path and parallel to the printing means for emitting the completed money orders from the housing in a direction extending substantially parallel to the first and second side walls following printing by the printing means.

2. The money order dispenser of claim 1 wherein the printer means includes a dot matrix printer extending transversely across the money orders for receiving the money orders and printing simultaneously a plurality of lines of alphanumeric indicia on the money order forms in a direction substantially perpendicular to the printer and parallel to the top and bottom edges of the money order forms.

3. The money order dispenser of claim 1, further comprising control means for controlling the dot matrix printer to change the orientation of the alphanumeric indicia such that the money orders are produced in a readable form.

4. An automatic money order dispenser for printing and dispensing money orders of the type printed on money order forms having relatively long longitudinal sides and relatively short transverse sides, comprising:

a money order issuing path having a longitudinal axis along which the money order forms travel with one of the relatively short transverse sides of each form positioned as a leading edge as the forms travel along the issuing path through the dispenser and with the relatively long longitudinal sides of the money order forms substantially parallel to the longitudinal axis;

printing means including a dot matrix printer for simultaneously printing alphanumeric indicia on the money order forms on a plurality of lines extending substantially parallel to the relatively long longitudinal sides of the forms thereby forming completed money orders to be issued;

the printing means being positioned entirely tranversely across the money order issuing path perpendicular to the longitudinal axis;

the dot matrix printer of the printing means further fixed in the longitudinal axis and movable in the direction perpendicular to the longitudinal axis;

means for insuring blank forms are not counterfeit including means sensing at least one code mark on each blank form said means for insuring also including means determining whether the blank forms are properly located in the printing means before actuating the printing means;

a housing enclosing the money order issuing path and printing means and having a compartment within the housing for storing the money order forms and having a slot in the housing for emitting the completed money orders; and control means connected to said printing means for controlling the dot matrix printer and for printing the alphanumeric indicia on the money order forms such that the alphanumeric indicia printed are readable in a direction substantially parallel to the relatively long longitudinal sides of the forms.

5. An automatic money order dispenser of claim 4 wherein the money order issuing path is adapted to receive pre-printed money order forms as a continuous series of forms having separation lines therebetween.

* * * * *

UNITED STATES PATENT AND TRADEMARK OFFICE
CERTIFICATE OF CORRECTION

PATENT NO. : 5,492,423
DATED : February 20, 1996
INVENTOR(S) : Lawrence G. Smith, Orlando, Fla.

It is certified that error appears in the above-indentified patent and that said Letters Patent is hereby corrected as shown below:

In the title of the patent, after "Orders", please delete "Including Means to Detect Money Orders".

In Column 6, line 64, replace "46" with --78--.

In Column 8, line 22, replace "24" with --42--.

In Column 8, line 51, replace "92" with --406--.

In Column 10. line 24, after "etc.", delete "The dot matrix printer 56 is preferably of the type manufactured by Epson Corporation."

Signed and Sealed this

Twenty-second Day of April, 1997

Attest:

BRUCE LEHMAN

*Attesting Officer*

*Commissioner of Patents and Trademarks*